(12) United States Patent
Wong

(10) Patent No.: US 10,742,513 B2
(45) Date of Patent: Aug. 11, 2020

(54) NETWORK INTERCONNECT AS A SWITCH

(71) Applicant: David I-Keong Wong, Fremont, CA (US)

(72) Inventor: David I-Keong Wong, Fremont, CA (US)

(73) Assignee: David I-Keong Wong, Fremont, CA (US)

( * ) Notice: Subject to any disclaimer, the term of this patent is extended or adjusted under 35 U.S.C. 154(b) by 0 days.

(21) Appl. No.: 16/257,653

(22) Filed: Jan. 25, 2019

(65) Prior Publication Data

US 2019/0245751 A1   Aug. 8, 2019

Related U.S. Application Data

(63) Continuation-in-part of application No. 15/888,516, filed on Feb. 5, 2018, now Pat. No. 10,477,288.

(51) Int. Cl.

| H04L 12/24 | (2006.01) |
|---|---|
| H04Q 11/00 | (2006.01) |
| H04L 12/44 | (2006.01) |
| H04L 12/46 | (2006.01) |
| H04L 12/733 | (2013.01) |
| H04L 12/803 | (2013.01) |
| H04B 10/25 | (2013.01) |
| H04B 10/40 | (2013.01) |

(52) U.S. Cl.
CPC ............. *H04L 41/12* (2013.01); *H04L 12/44* (2013.01); *H04L 12/4625* (2013.01); *H04L 41/0826* (2013.01); *H04L 45/122* (2013.01); *H04L 47/125* (2013.01); *H04Q 11/0071* (2013.01); *H04B 10/25* (2013.01); *H04B 10/40* (2013.01); *H04Q 11/0003* (2013.01); *H04Q 11/0062* (2013.01); *H04Q 2011/006* (2013.01); *H04Q 2011/0096* (2013.01); *H04Q 2011/0098* (2013.01)

(58) Field of Classification Search
None
See application file for complete search history.

(56) References Cited

U.S. PATENT DOCUMENTS

2001/0053149 A1* 12/2001 Mo .................. H04L 29/12009
  370/389
2014/0098823 A1   4/2014 Kapadia et al.
(Continued)

OTHER PUBLICATIONS

U.S. Appl. No. 15/888,516, Notice of Allowance and Examiner Interview Summary dated Jul. 2, 2019.
(Continued)

*Primary Examiner* — Darren E Wolf
(74) *Attorney, Agent, or Firm* — Alston & Bird LLP

(57) ABSTRACT

An interconnect as a switch module ("ICAS" module) comprising n port groups, each port group comprising n−1 interfaces, and an interconnecting network implementing a full mesh topology where each port group comprising a plurality of interfaces each connects an interface of one of the other port groups, respectively. The ICAS module may be optically or electrically implemented. According to the embodiments, the ICAS module may be used to construct a stackable switching device and a multi-unit switching device, to replace a data center fabric switch, and to build a new, high-efficient, and cost-effective data center.

9 Claims, 19 Drawing Sheets

(56) References Cited

U.S. PATENT DOCUMENTS

| | | |
|---|---|---|
| 2015/0186318 A1 | 7/2015 | Kim et al. |
| 2016/0277320 A1 | 9/2016 | Judge et al. |
| 2017/0063631 A1 | 3/2017 | Curtis et al. |
| 2017/0214579 A1 | 7/2017 | Chen et al. |
| 2017/0310594 A1 | 10/2017 | Kotha et al. |
| 2018/0167307 A1* | 6/2018 | Barry ................. H04L 45/48 |
| 2018/0287818 A1* | 10/2018 | Goel .................. H04L 49/70 |
| 2019/0109783 A1 | 4/2019 | Kommula et al. |
| 2019/0246187 A1 | 8/2019 | Wong |

OTHER PUBLICATIONS

U.S. Appl. No. 15/888,516, Requirement for Restriction/Election dated Apr. 2, 2019.

Ferreira et al., "Facebook: Fabric Aggregator, Modular Design to Address our Traffic Demands," OpenCompute Project, 34 pages, (2018). [Retrieved from the Internet Feb. 13, 2019: <URL: https://www.opencompute.org/wiki/Networking/SpecsAndDesigns#Facebook_Fabric_Aggregator_-_based_on_Wedge_100S>].

* cited by examiner

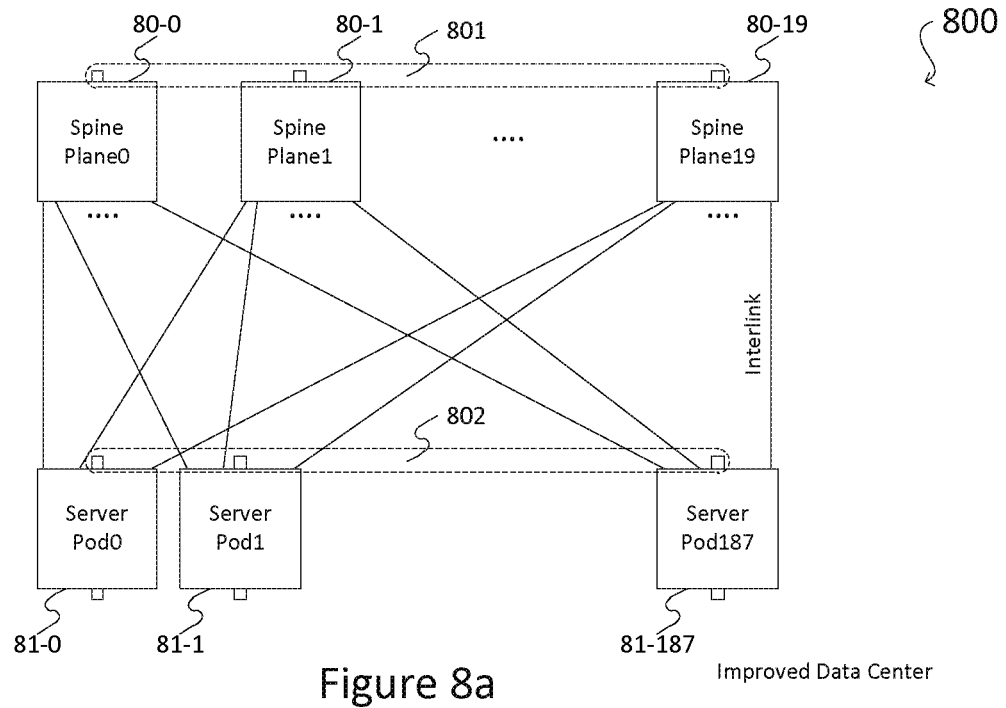
Figure 8a  Improved Data Center
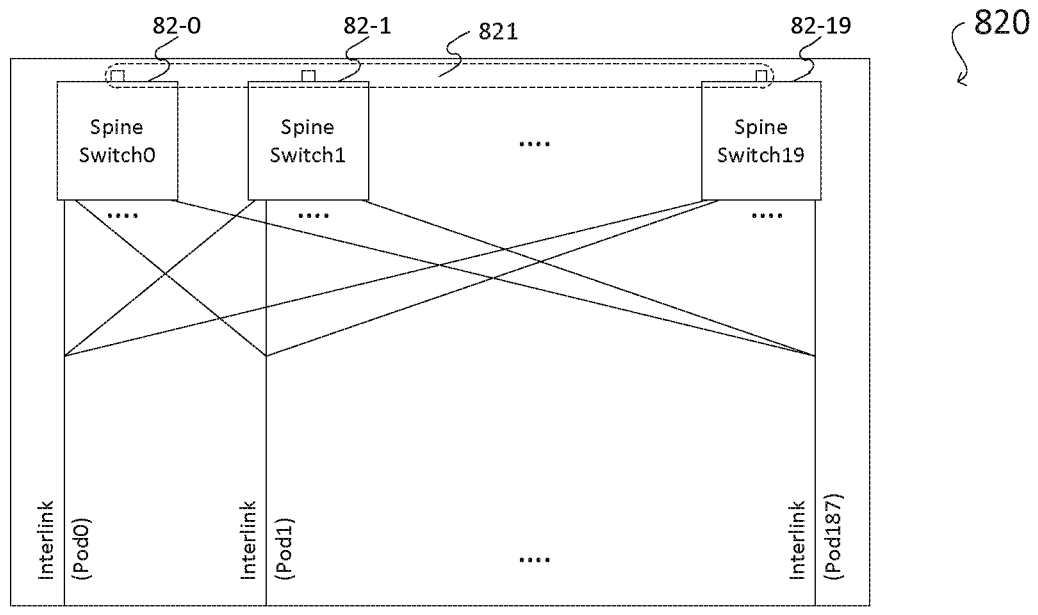
Figure 8b  Spine Plane

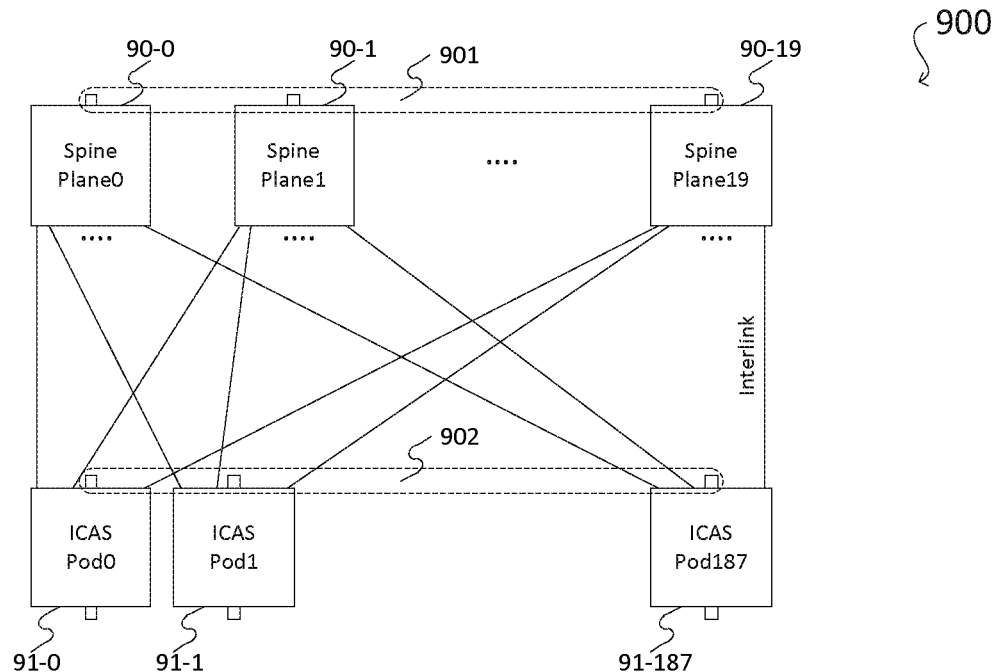
Figure 9a — ICAS-based Data Center
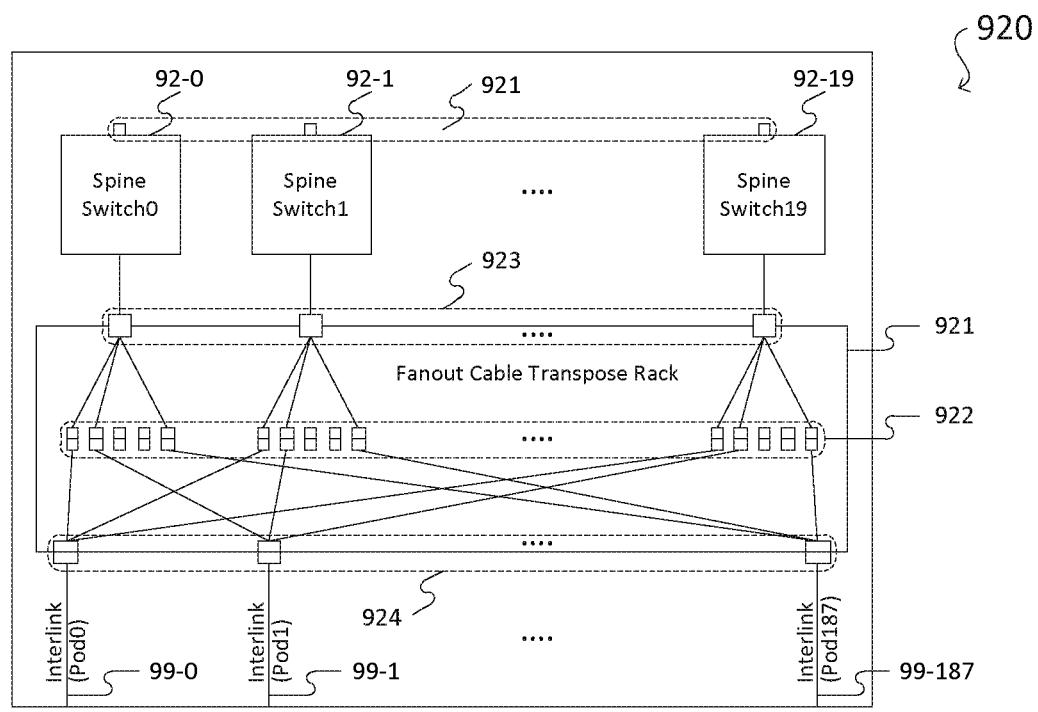
Figure 9b — Spine Plane

NETWORK INTERCONNECT AS A SWITCH

CROSS-REFERENCE TO RELATED APPLICATION

This application is a Continuation-in-Part application of U.S. application Ser. No. 15/888,516 filed Feb. 5, 2018, which is incorporated herein by reference in their entireties, including any figures, tables, and drawings.

FIELD OF INVENTION

The present invention relates to computer network. In particular, the present invention relates to interconnecting structure of ICAS module, stackable switching device, multi-unit chassis switching device, network pod, fanout cable transpose rack and datacenter network.

DISCUSSION OF THE RELATED ART

As a result of the recent rapid growth in application needs—in both size and complexity—today's network infrastructure is scaling and evolving at a high rate. The data traffic that flows from a data center to the Internet—i.e., "machine-to-user" traffic—is large, and ever increasing, as more people get connected, and as new products and services are created. However, machine-to-user traffic is merely "the tip of the iceberg," when one considers the data traffic within the data center—i.e., "machine-to-machine" traffic—necessary to generate the machine-to-user data traffic. Generally, machine-to-machine data traffic is several orders of magnitude larger than machine-to-user data traffic.

The back-end service tiers and applications are distributed and logically interconnected within a data center. To service each user who uses an application program ("app") or a website, these back-end service tiers and applications rely on extensive real-time "cooperation" with each other to deliver the user's expected customized fast and seamless experience at the front end. To keep up with the demand, even though the internal applications are constantly being optimized to improve efficiency, the corresponding machine-to-machine traffic grows at an even faster rate than their continual optimization (e.g., at the current time, machine-to-machine data traffic is growing roughly faster than doubling every year).

To be able to move fast and to support rapid growth are goals that are at the core of data center infrastructure design philosophy. In addition, the network infrastructure within a data center ("data center network") must be simple enough as to be managed by a small, highly efficient team of engineers. It is desired that the data center network evolves in the direction that makes deploying and operating the network easier and faster over time, despite scale and exponential growth.

Some of these applications needs relate to the increasing use of data analytic tools ("big data") and artificial intelligence ("AI"), for example. As discussed above, big data and AI have become very significant distributed applications. Servicing these applications require handling large amounts of data (e.g., petabytes), using great computation power (e.g., petaflops), and achieving very low latency (e.g., responses that become available within 100 ns). Simultaneously providing more powerful processors ("scaling-up") and exploiting greater parallel processing ("scaling-out") have been the preferred approach to achieve performance. Unlike scientific computation, however, big-data and AI applications are delivered in the form of services to large numbers of users across the world. Thus, like web servers for web services, clusters of servers dedicated to big data and AI applications have become significant parts of the data center network.

At the current time, data center networks have largely transitioned from layer-2 to all layer-3 (e.g., running Border Gateway Protocol (BGP) and Equal-cost Multi-Path (ECMP) protocols). A large-scale data center today is typically operating at tens of petabits-per-second scale (petascale) and expects growth into the hundreds of petabits-per-second scale in the near future. The cost of provisioning such data center ranges from US$300 million to US$1.5 billion.

Let us define several terms in Table 1, before proceeding with the description of this patent.

TABLE 1

| Terminology | Description |
|---|---|
| media | The media is a concept of a physical entity. It can be optical or electronic. |
| interface | An interface is a concept of a physical entity. It contains a transmission media and a reception media. The media can be optical or electrical. An interface can associate with a MAC (Medium Access Control) entity or several interfaces can associate with a MAC entity. |
| port | A port is a concept of a container entity. It includes a set of interfaces. The number of the interfaces depends on the technology. For example, a 40G QSFP Ethernet port consists of 4 interfaces (a total of 8 fibers). The 40G QSFP port associates with a MAC entity. The 10/40G optical technology is implemented by reconfiguring the 40G QSFP Ethernet to 4 independent 10G interfaces each associates with a MAC entity. As such, each interface can provide connectivity and operate like a port. |
| port group | A port group is a concept of a container entity; it includes a set of ports; the number of ports depends on application. Each interface in a port group is configured to associate with a MAC presumably. In order to meet the needs of description, this patent introduces and defines the term of "port group". |
| connection | A connection consists of media and two interfaces communicating through the media. |
| link | A link is a concept of a container entity. It includes a set of connections. The number of the connections depends on the technology. For example, two 40G QSFP connectors docked together to form one link which contains 4 connections; two 10/40G QSFP connectors docked together to form 4 links each contains 1 connection. |

TABLE 1-continued

| Terminology | Description |
| --- | --- |
| downlink | Refers to the link that connects toward the hosts. |
| uplink | Refers to the link that connects toward the core of the network. |
| intralink | Refers to the link that provides connectivity inside a pod. |
| interlink | Refers to the link that provides connectivity between two pods. |

A review of our current state-of-the-art data center infrastructure is instructive. In the following context, data or traffic aggregation refers to multiplexing of communication frames or packets. Aggregation model and disaggregation model refer to topologies of communication networks. The concept of data aggregation is orthogonal to the concept of an aggregation or disaggregation model. Therefore, a disaggregation model can support data aggregation, as discussed below. A basic concept in data communication is that communication channels can be error prone. Transmission over such communication channels at higher data rates and over large distances requires complex and costly transceivers. Consequently, channel encoding, error detection and correction, and communication protocols are many techniques to ensure data is transmitted over long distances with accuracy. In the past, as data transmission was expensive, data aggregation (e.g., multiplexing from different data streams and multiplexing data from multiple topological sources) and data compression ensure even higher utilization of the communication channels and efficient management of the communication cost. This is the origin of the aggregation (i.e., in both data and topology) paradigm. This paradigm dominates the networking industry for decades. Such aggregation is widely used in wide area networks (WANs), where transmission cost dominates over other network costs. Today's hardware architecture for data switching is also based on aggregation, i.e., each port is connected and aggregated from all other port. In today's communication networks, data is typically aggregated before transmitting on to "uplink" to connect to external network (e.g., the Internet), which tends to be the most expensive port of the data switching equipment. Due to both advances in semiconductor, fiber-optical, and interconnect technologies and economy of scale, network costs have reduced significantly. The aggregation model is not necessarily the only—or the most suitable—solution in a data center. In today's data center networks, where machine-to-machine traffic ("east-west traffic") dominates most of the bandwidth, being several orders of magnitude than the machine-to-user bandwidth, multipath topology and routing (ECMP) are deployed so that the combined network bandwidth is large. However, traffic is still aggregated from all incoming port on to each outgoing port. Nonetheless, the multipath topology signifies a disaggregation model. The detailed description below places a structure and quantification onto the multipath topology and discloses a disaggregation model, referred to herein as "interconnect as a Switch" ("ICAS"), which is significantly different from the more traditional aggregation model for data centers.

Typically, in an enterprise or intranet environment, communication patterns are relatively predictable with a modest number of data sources and data destinations. These data sources and data destinations are typically connected by a relatively small number of designated paths ("primary paths"), with some number of back-up or "secondary paths," which are provided primarily for fault tolerance. In such an environment, the routing protocols of the enterprise network are optimized to select a shortest single path between each source-destination pair in the absence of a failure.

Distributed computing frameworks (e.g., MapReduce, Hadoop and Dryad) and web services (e.g., web search, ecommerce, social networking, data analytics, artificial intelligence and scientific computing) bring a new paradigm of computing that requires both interconnections between a diverse range of hosts and significant aggregate bandwidths. Due to the scarcity of ports even in the high-end commercial switches, a common hierarchical network topology that has evolved is a fat tree with higher-speed ports and increasing aggregate bandwidths, as one moves up the hierarchy (i.e., towards the roots). The data center network, which requires substantial intra-cluster bandwidths, represents a departure from the earlier hierarchical network topology. In the multi-rooted tree, the shortest single-path routing protocol can significantly underutilize the available bandwidths. The ECMP is an improvement that statically stripes flows across available paths using flow hashing techniques. ECMP is standardized in the IEEE 802.1Q Standard. ECMP allows "next-hop packet forwarding" to a single destination to occur over multiple "best paths," as symmetric insuring flows on deterministic paths. Equal cost multi-path routing can be used in conjunction with most routing protocols, because it is a per-hop decision limited to a single router. It can substantially increase bandwidth by load-balancing traffic over multiple paths. When a data packet of a data stream arrives at the switch, and multiple candidate paths are available for forwarding the data packet to its destination, selected fields of the data packet's headers are hashed to select one of the paths. In this manner, the flows are spread across multiple paths, with the data packets of each flow taking the same path, so that the arrival order of the data packets at the destination is maintained.

Note that ECMP performance intrinsically depends on both flow size and the number of flows arriving at a host. A hash-based forwarding scheme performs well in uniform traffic, with the hosts in the network communicating all-to-all with each other simultaneously, or in which individual flow last only a few round-trip delay times ("RTTs"). Non-uniform communication patterns, especially those involving transfers of large blocks of data, do not perform well under ECMP without careful scheduling of flows to avoid network bottlenecks.

In the detailed description below, the terms "fabric switch" and "spine switch" are used interchangeably. When both terms appear in a network, a fabric switch refers to a device in a network layer which is used for multipath networking among TOR devices, while a spine switch refers to a device in a higher network layer which is used for multipath networking among pods.

A fat tree network suffers from three types of drawbacks—i.e., 1) congestion due to hash collision, 2) congestion due to an aggregation model, and 3) congestion due to a blocking condition. These congestions are further examined in the following.

First, under ECMP, two or more large, long-lived flows can hash to the same path ("hash collision"), resulting in congestion, as illustrated in FIG. 1a. FIG. 1a shows four fabric switches 10-0 to 10-3 interconnecting five TOR switches 11-0 to 11-4. As shown in FIG. 1a, each TOR switch has four ports each communicating with a port of one of the fabric switches 10-0 to 10-3, respectively. Each fabric switch has five ports each communicating with a port of one of TOR switches 11-0 to 11-4, respectively. In FIG. 1a, two flows designating TOR switch 11-0 are sourced from TOR switches 11-1 and 11-2. However, by chance, each flow is hashed to a path that goes through fabric switch 10-0, which causes congestion at designating port 101 of fabric switch 10-0. (Of course, the congestion problem could have been avoided if one of the flows is hashed to a path that goes through fabric switch 10-1 for instance). Furthermore, the static mapping of the flows to paths by hashing does not consider either current network utilization or the sizes of the flows, so that the resulting collision overwhelms switch buffers, degrade overall switch utilization, and increases transmission latency.

Second, in a fat tree network, the total bandwidth of the aggregated traffic may exceed the bandwidth of all the downlinks of all the fabric switches facing the same TOR switch, resulting in aggregation congestion, as shown in FIG. 1b. Such aggregation congestion is a common problem in the aggregation model of today's switching network, and requires detailed rate limiting to avoid congestion. In FIG. 1b, the traffic through the fabric switches 12-0 to 12-3 facing the TOR switch 13-0 is sourced from the TOR switches 13-1 to 13-4, but the aggregate traffic from the source (one source each from TOR switches 13-1 to 13-3 and two sources from TOR switch 13-4) exceeds the combined bandwidth of all the downlinks of all the fabric switches 12-0 to 12-3 facing the TOR switch 13-0. More specifically, traffic is spread out evenly over fabric switch 12-1 to 12-3 without congestion; additional traffic from TOR switch 13-4 exceeds the downlink bandwidth of port 121 of fabric switch 12-0 and thus causes congestion.

Third, there is a blocking condition called the "strict-sense blocking condition," which is applicable to statistically multiplexed flow-based networks (e.g., a TCP/IP network). The blocking condition results from insufficient path diversity (or an inability to explore path diversity in the network) when the number and the size of the flows become sufficiently large. FIG. 1c illustrates the blocking condition in a fat tree network. As shown in FIG. 1c, the blocking condition occurs, for example, when paths from fabric switches 14-0 and 14-1 to TOR switch 15-0 are busy and paths from fabric switches 14-2 and 14-3 to TOR switch 15-3 are busy, and a flow which requires a path through TOR switch 15-0 arrives at TOR switch 15-3. An extra flow between TOR switch 15-0 and 15-3 can take one of 4 possible paths. Say it takes the path from TOR switch 15-3 to fabric switch 14-1 and then from fabric switch 14-1 to TOR switch 15-0. However, the path from fabric switch 14-1 to TOR switch 15-0 is busy already. Overall, multiplexing the blocked flow on to the existing flows results in increased congestion, latency and/or packet loss.

At the same time as the demand on the data center network grows, the rate of growth in CMOS circuit density ("Moore's law") and the I/O circuit data rate appear to have slowed. The cost of lithographic and heat density will ultimately limit how many transistors can be packed into a single silicon package. That is to say, an ultra large storage or computing system is bound to be achieved through multiple chips. It is unlikely that an ultra large system will be integrated on a single chip with ultra-high integration density as in the past. The question that arises here is how to build an ultra large bandwidth interconnection between the chips. It is instructive to learn that a switching chip soldered on printed circuit board (PCB) employs high-speed serial differential I/O circuit to transmit and receive data to/from transceiver module. A transceiver module interconnects to a transceiver module on a different system to accomplish network communications. An optical transceiver performs the electrical-to-optical and optical-to-electrical conversion. An electrical transceiver performs complex electrical modulation and demodulation conversion. The primary obstacle that hinders high-speed operation on PCB is the frequency-dependent losses of the copper-based interconnection due to skin effects, dielectric losses, channel reflections, and crosstalk. Copper-based interconnection faces the challenge of bandwidth limit as the data rate exceeds several tens of gigabit per second (Gb/s). To satisfy demands for bigger data bandwidth high-radix switch silicon integrates hundreds of differential I/O circuits. For example, Broadcom Trident-II chip and Barefoot Network Tofino chip integrate 2×128 and 2×260 differential I/O circuits for 10 Gb/s transmit and receive respectively. To optimize system level port density, heat dissipation and bandwidth the I/O circuits and interfaces are gathered in groups and standardized in specifications on electrical and optical properties. For SFP+, each port has a pair of TX and RX serial differential interfaces at 10 Gb/s data rate. For QSFP, each port has four pairs of TX and RX serial differential interfaces at 10 Gb/s data rate each for a total of 40 Gb/s or 4×10 Gb/s data rate. For QSFP28, each port has four pairs of TX and RX serial differential interfaces at 25 Gb/s data rate each for a total of 100 Gb/s or 4×25 Gb/s data rate. For QSFP-DD, each port has eight pairs of TX and RX serial differential interfaces with a data rate of 50 Gb/s data rate each for a total of 400 Gb/s or 8×50 Gb/s data rate. State of the art data centers and switch silicon employ 4 or 8 interfaces (TX, RX) at 10 Gb/s or 25 Gb/s or 50 Gb/s per port as design considerations. These groupings are not necessarily unique. MTP/MPO as an optical interconnect standard defines up to 48 interfaces per port where each interface contains a pair of optical fibers one for transmit and one for receive. However the electrical and optical specifications of transceiver with up to 48 interfaces per module are yet to come. The definition of "port group" in this patent disclosure is extended to include more interfaces crossing multiple ports (e.g., 8 interfaces from 2 QSFP's; 32 interfaces from 8 QSFP's, etc.). A person experienced in the art can understand that this invention is applicable to other interconnect standards where multiple various number of interfaces other than 4 be grouped together in the future.

These limitations affect data center networks by, for example, increasing power consumption, slowing of performance increase, and increasing procurement cycle. These developments exacerbate the power needs for the equipment, as well as their cooling, facility space, the cost of hardware, network performance (e.g., bandwidth, congestion, and latency, management), and the required short time-to-build.

The impacts to network communication are several:
(a) The network industry may not have enough economy of scale to justify CMOS technology of a smaller footprint;
(b) Simpler solutions should be sought to advance network technology, rather than to create more complex ones and packing more transistors;
(c) Scale-out solutions (i.e., in complement to scale-up solution) should be sought to solve application problems (e.g., big-data, AI, HPC, and data center);

(d) The chip port density (i.e., the number of ports in the traditional sense) can become flat[1]; and (e) Implementation of interfaces with signal rates in excess of 100G will become increasingly difficult[2].

[1] Integration of optical technology to the CMOS device may provide new opportunity. However, do not expect a very high-radix chip, which would allow network scalability, to emerge any time soon.

[2] One must think beyond the aggregation model (e.g., the disaggregation model) to meet new network challenges.

Historically, high-speed networks have two classes of design space. In the first class of design space, HPC and supercomputing networks typically adopt direct network topologies. In a direct network topology, every switch is connected to servers, as well as other switches in the topology. Popular topologies include mesh, torus, and hypercube. This type of network is highly resource efficient and offers high capacity through numerous paths of various lengths between a source and destination. However, the choice of which path to forward traffic over is ultimately controlled by proprietary protocols (i.e., non-minimum routing) in switches, NICs, and by the end-host application logic. That is, an algorithm or manual configuration is required to achieve routing. Such routing protocols increase the burden on the developer and create a tight coupling between applications and the network.

In the second class of design space, data centers scaling-out have resulted in the development of indirect network topologies, such as folded-Clos and multi-rooted trees ("fat trees"), in which servers are restricted to the edges of the network fabric. The interior of the network fabric consists of dedicated switches that are not connected to any servers, but simply route traffic within the network fabric. Data center networks of this type thus have a much looser coupling between applications and network topology, placing the burden of path selection on the network switches themselves. That is to say, based on Internet routing technology such as BGP (Border Gateway Protocol) routing protocol. The BGP routing protocol has a complete set of loop prevention, shortest path and optimization mechanisms. However, there are strict requirements and restrictions on the network topology. Data center technology based purely on Internet BGP routing cannot effectively support multi-path with non-shortest path topologies. As a result data center networks have traditionally relied on fat tree topologies, simple routing and equal cost multipath selection mechanisms (e.g., ECMP). It is precisely because data center routing technology has restrictions on the network topology. The benefits to datacenter from non-shortest multipath path network topology other than the equal cost multipath topology have not been explored in the past years of developments of the datacenter technologies.

The BGP and ECMP protocols are not without flaws. ECMP relies on static hashing of flows across a fixed set of shortest equal cost paths to a destination. For hierarchical topologies (e.g., fat tree), ECMP routing has been largely sufficient when there are no failures. However, even now direct network topologies (e.g., Dragonfly, HyperX, Slim Fly, BCube, and Flattened Butterfly), which employ paths of different lengths, have not seen adoption in data centers because of the limitations imposed by both commodity data center switches and the widespread adoption of ECMP routing in data center networks. ECMP is wasteful of network capacity when there is localized congestion or hot-spots, as it ignores uncongested longer paths. Further, even in hierarchical networks, ECMP makes it hard to route efficiently in the presence of failures, and when the network is no longer completely symmetric, and non-shortest paths are available for improving network utilization.

FIG. 2a shows an architecture of a typical state-of-the-art data center network, organized by three layers of switching devices—i.e., "top-of-rack" (TOR) switches and fabric switches implemented in 96 server pods 21-0 to 21-95 and spine switches implemented in 4 spine planes 20-0 to 20-3—interconnected by interlinks in a fat tree topology. Details of a spine plane is shown in FIG. 2b where a spine plane consists of 48 spine switches 22-0 to 22-47 each connecting to 96 server pods. The connections from all 48 spine switches are grouped into 96 interlinks each including a connection from one of spine switches 22-0 to 22-47, respectively, for a total of 48 connections per interlink. Details of a server pod is shown in FIG. 2c, in which a server pod is shown to consist of 48 TOR switches 24-0 to 24-47 and 4 fabric switches 23-0 to 23-3, with each TOR switch connected to all 4 fabric switches. Combining the connection information from FIG. 2b, server pod of FIG. 2c may comprise 4 fabric switches 23-0 to 23-3 each connects one of 4 spine planes by interlinks, respectively; each interlink comprising 48 connections each connects one of 48 spine switches in a spine plane, respectively. Each TOR switch provides 48×10G connections in 12×QSFP interfaces as downlink to connect to servers. An edge pod is shown in FIG. 2d, details will be given in below.

As shown in FIGS. 2b and 2c, and in conjunction with FIG. 2a, the TOR, fabric and spine layers of switches include: (a) a TOR switch layer consisting of 96×48 TOR switches which connect the servers in the data center and which are equally distributed over 96 "server pods"; (b) a spine switch layer consisting of 4×48 spine switches equally distributed over the 4 "spine planes"; and (c) a fabric layer consisting of 96×4 fabric switches, also equally distributed over the 96 server pods. In addition, two of the server pods can be converted to two edge pods. FIG. 2d shows an edge pod. As shown in FIG. 2d, edge pod 250 may comprise 4 edge switches 25-0 to 25-3, each connects one of 4 spine planes by interlinks, respectively; each interlink comprising 48 connections each connects one of 48 spine switches in a spine plane, respectively. Each edge switch may include one or more uplinks that interconnect an external network.

Details of an implementation of the server and spine pods are further described below in FIG. 2c, 2b in relation to FIG. 2a. This configuration facilitates modularity by assembling each fabric switch and spine switch in an 8 U multi-unit chassis with 96 QSFP ports. As shown in FIG. 2c, each TOR switch is implemented by a switch with 16 QSFP ports, which allocates 12 QSFP ports to connect to the servers in 10G interfaces (i.e., downlinks) and 4 QSFP ports to connect to the four fabric switches in four 40G interfaces in the same server pod. (In this detailed description, a QSFP represents a 40 Gbits/second bandwidth, which can be provided in a single 40G interface or four 10G interfaces, each 40G interface including four receive-transmit pairs of optical fibers and each 10G interface including a receive-transmit pair of optical fibers). The 40G interface between a TOR switch and a fabric switch is used for both intra-pod and inter-pod data traffic.

Each fabric switch in a server pod is implemented by a 96 QSFP ports switch, which allocates (i) 48 QSFP ports in 48 40G interfaces with the 48 TOR switches in the server pod in a fat tree topology, and (ii) 48 QSFP ports in 48 40G interfaces to the 48 spine switches in the single spine plane the fabric switch is connected.

Each spine switch in a spine plane is also implemented by a 96 QSFP ports switch, which provides all 96 QSFP ports in 96 40G interfaces with the 96 fabric switches connected to the spine plane, one from each of the 96 server pods. The data traffic through the spine plane represents inter-pod communications mostly for the server pods.

In the configuration of FIG. 2a, each server pod includes (i) 384 QSFP transceivers, half of which are provided to the spine planes and half of which are provided to the network side of the fabric switches, (ii) 192 QSFP transceivers provided to the network side of the TOR switches, (iii) 576 transceivers provided to the servers; (iv) 192 optical QSFP cables, (v) 36 application-specific integrated circuits (ASICs), which implements the fabric switches and (vi) 48 ASICs, which implements the TOR switches. The ASIC suitable for this application may be, for example, the Trident-II Ethernet Switch ("Trident II ASIC"). Each spine plane includes 4608 QSFP transceivers, 4608 optical QSFP cables and 432 Trident II ASICs.

The implementation of FIG. 2a provides in practice improved congestion performance but does not eliminate congestion. The network organization is based on an aggregation model, intended to improve cost and utilization of communication ports and transmission media under the aggregation model. While this aggregation model may still be valuable for wide-area networks (e.g., the Internet), recent advances of semiconductor technology and economic of scale have called this aggregation model into question, when applied to local area networks.

Summary

According to one embodiment of the present invention, an interconnect as a switch module ("ICAS" module) comprises n port groups, each port groups comprising n−1 interfaces, and an interconnecting network implementing a full mesh topology where each port group comprising a plurality of interfaces each connects an interface of one of the other port groups, respectively.

According to one embodiment of the present invention, a stackable switching device is provided, which includes one or more ICAS modules as depicted above, a plurality of switching devices, and a stackable rackmount chassis, each ICAS module being connected to the plurality of switching devices, such that the ICAS module interconnects at least some interfaces of at least some port groups of different switching devices to form a full mesh non-blocking interconnection, while the rest interfaces of the at least some port groups for interconnecting different switching devices are configured as interfaces for uplink. The ICAS module and the switching devices are housed in the stackable rackmount chassis.

One embodiment of the present invention provides a multi-unit switching device, which includes: one or more ICAS modules implemented on a PCB as a circuit, a plurality of switching devices, and a multi-unit rackmount chassis, each ICAS module being connected to the plurality of switching devices, such that the ICAS module interconnects at least some interfaces of at least some port groups of different switching devices to form a full mesh non-blocking interconnection, while the rest interfaces of the at least some port groups for interconnecting different switching devices are configured as interfaces for uplink. The ICAS module and the switching devices are packaged in the multi-unit rackmount chassis.

According to one embodiment of the present invention, a network pod is disclosed, which includes: a plurality of first layer switching devices, each having a plurality of interfaces for downlink interfaces configured to receive and transmit data signals from and to a plurality of servers, and each having a plurality of network side interfaces divided into a plurality of interlinks and a plurality of intralinks, and the interlink interfaces being configured to connect to higher layer switching devices, and the intralink interfaces of the first layer switching devices each being configured and grouped into one or more port groups; and one or more second layer devices of ICAS modules whose interfaces are divided into intralink interfaces and uplink interfaces, and the intralink interfaces of an ICAS module being grouped into port groups to connect to the corresponding port groups of the first layer switching devices, and each port groups of additional ICAS module being connected to the additional port group of each of the first layer switches, and the uplink interfaces are configured to connect to the external network. The first layer switching devices and the second layer devices are interconnected to implement a full mesh network of a predetermined number of nodes.

K spine planes each having p interlinks are used to connect p network pods each having k TOR switches. In a spine plane, k spine switches interconnect to a fanout cable transpose rack.

According to one embodiment of the present invention, a fanout cable transpose rack may include: k first port groups connecting to corresponding port groups of k spine switches through first plurality of fiber optic cables; p second port groups through connecting second plurality of fiber optic cables to form p interlinks. A plurality of fanout cables are used to cross-connect the k first port groups and the p second port groups so that connections from all k spine switches are grouped into p interlinks, each interlink including one connection from each spine switch, and each interlink having a total of k connections.

According to one embodiment of the present invention, a data center network may have a plurality of interfaces for downlink configured to receive and transmit data signals from and to a plurality of servers, and a plurality of interfaces for uplink configured to connect the Internet or connect another data center network with a similar configuration. The data center network may include: a group of network pods (server pods/ICAS pods), each network pod in the group including: (a) a group of first layer switching devices, providing some interfaces as interfaces for downlink, and having the rest interfaces grouped into one or more network side port groups; and (b) one or more second layer devices, configured to interconnect at least some interfaces between some port groups of the first layer switching devices, wherein the rest interfaces of the some port groups for interconnecting the first layer switching devices are configured as interfaces for uplink. The first layer switching devices and the second layer devices are interconnected to implement a full mesh network of a predetermined number of nodes. The network pod further comprises a group of switch clusters, each including a group of third layer switching devices, each of which routes a plurality of data signals received from or transmitted to a corresponding first layer switching device in each group of network pods.

By simplifying the data center network infrastructure and reducing hardware requirement, the present invention addresses the problems relating to the power needs for the equipment and their cooling, facility space, the cost of hardware, network performance (e.g., bandwidth, congestion, and latency, management), and the required short built time.

The present invention is better understood upon consideration of the detailed description below in conjunction with the accompanying drawings.

BRIEF DESCRIPTION OF THE DRAWINGS

FIG. 2b shows in detail an implementation of a spine plane of the data center network of FIG. 2a.

FIG. 6a shows network 600, which is a more compact representation of the network of FIG. 5a.

FIG. 8a shows an improved data center network 800, in accordance with one embodiment of the present invention; data center networks 800 includes 20 spine planes, providing optional uplinks 801, and 188 server pods, providing optional uplinks 802, uplinks 801 and 802 connecting to one or more external networks.

FIG. 8b shows in detail an implementation of modified spine plane 820, having 20 spine switches, providing optional uplink 821 for connecting to an external network.

FIG. 9a shows ICAS-based data center network 900, achieved by replacing the server pods of network 800 of FIG. 8a (e.g., server pod 830 of FIG. 8c) with ICAS pods 91-0 to 91-197, each ICAS pod being shown in greater detail in FIG. 9c, according to one embodiment of the present invention; in FIG. 9a, optional uplinks 901, shared by 20 spine planes, and optional uplinks 902, shared by 188 ICAS pods are provided for connecting to an external network.

FIG. 9b shows in detail spine plane 920, which implements one of the spine planes in data center network 900 and which is achieved by integrating a fanout cable transpose rack into spine plane 820 of FIG. 8b, according to one embodiment of the present invention; the spine switches in spine plane 920 provide optional uplink 921 for connecting to an external network.

To facilitate cross-referencing among the figures and to simplify the detailed description, like elements are assigned like reference numerals.

DETAILED DESCRIPTION OF THE PREFERRED EMBODIMENTS

Figure 3:
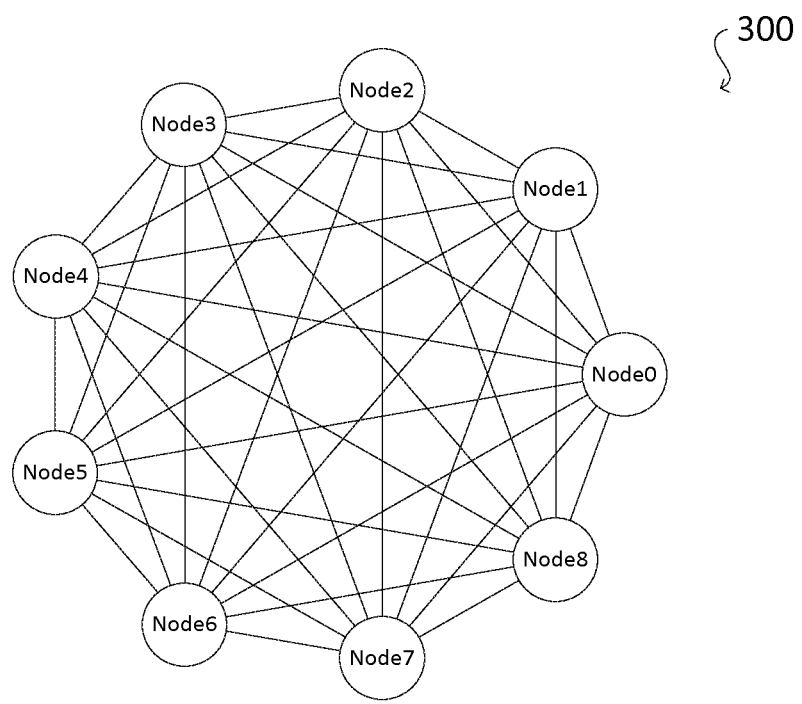
FIG. 3 illustrates a "full mesh" topology in a network of 9 nodes.

The present invention simplifies the network architecture by eliminating the switches in the fabric layer based on a new fabric topology, referred herein as the "interconnect-as-a-switch" (ICAS) topology. The ICAS topology of the present invention is based on the "full mesh" topology. In a full mesh topology, each node is connected to all other nodes. The example of a 9-node full mesh topology is illustrated in FIG. 3. The inherent connectivity of a full mesh network can be exploited to provide fabric layer switching.

Figure 4A:
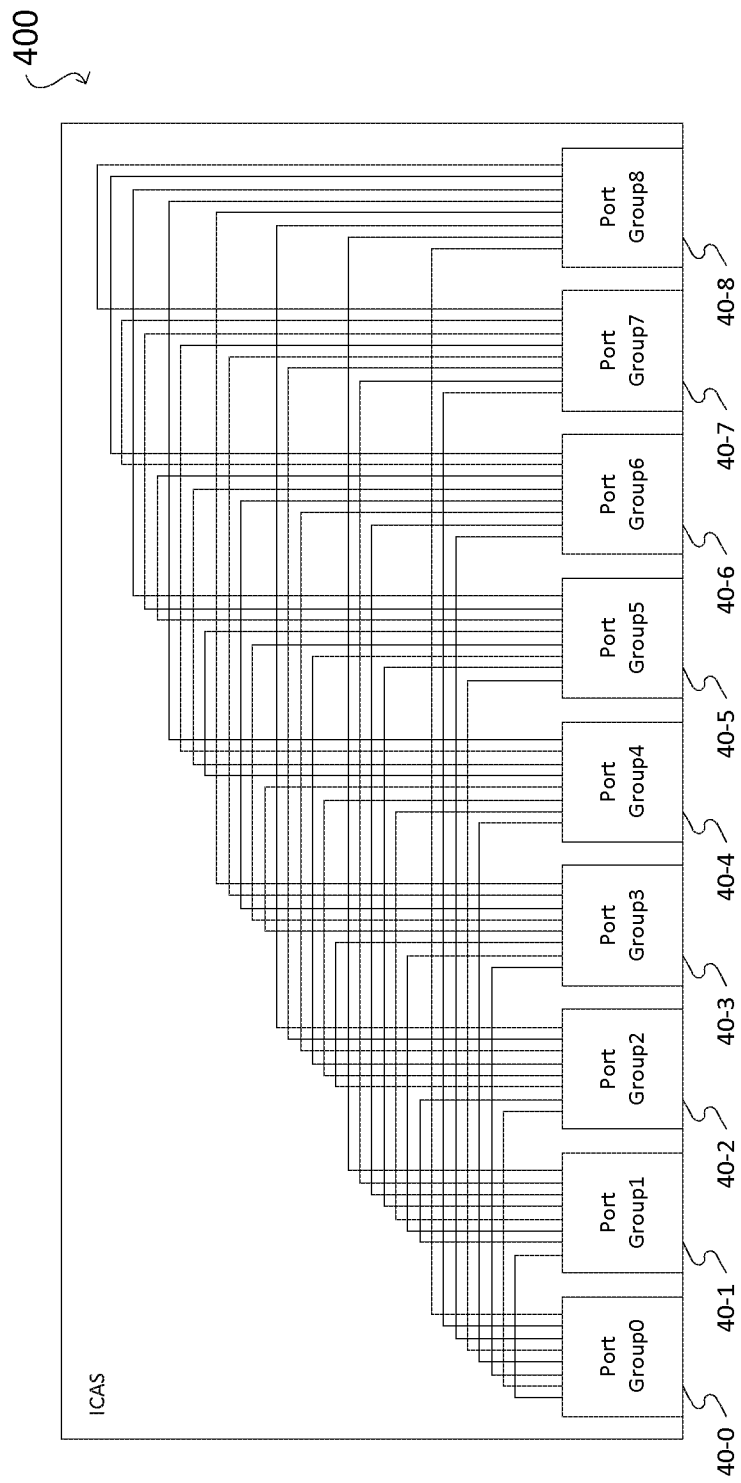
FIG. 4a shows ICAS module 400, which interconnects 9 nodes, according to the full mesh topology of FIG. 3.

As discussed in further detail below, the ICAS topology enables a data center network that is far superior to a network of the fat tree topology used in prior art data center networks. Unlike other network topologies, the ICAS topology imposes a structure on the network which reduces congestion in a large extent. According to one embodiment, the present invention provides an ICAS module as a component for interconnecting communicating devices. FIG. 4a shows ICAS module 400, which interconnects 9 nodes according to the full mesh topology of FIG. 3.

FIG. 4a shows ICAS module 400 having port groups 40-0 to 40-8 and each port group providing 8 external interfaces and 8 internal interfaces. In ICAS module 400, each of the internal interfaces of a port group connects an internal interface of one of the other port groups, respectively. In fact, each port group is connected to every one of the other port groups through exactly one internal interface. In this context, each "interface" includes a receive-transmit pair of optical fibers capable of, for example, a 10 Gbits per second data rate. In FIG. 4a, the port groups are indexed as 0-8. Indexes can also be arbitrary unequal values (For example, these 9 port groups can also be indexed as 5, 100, 77, 9, 11, 8, 13, 50, and 64). The 8 internal interfaces for these 9 port groups are indexed according to the indexes of the connected port groups (For example, the internal interfaces for the 7-th port group are 0, 1, 2, 3, 4, 5, 6 and 8 in the first example; and are 5, 100, 77, 9, 11, 8, 13 and 64 in the second example). Furthermore, internal interface j of port group i is connected to internal interface i of port group j. The external interfaces for each port group of ICAS module 400 are indexed sequentially as 0-7.

Figure 4B:
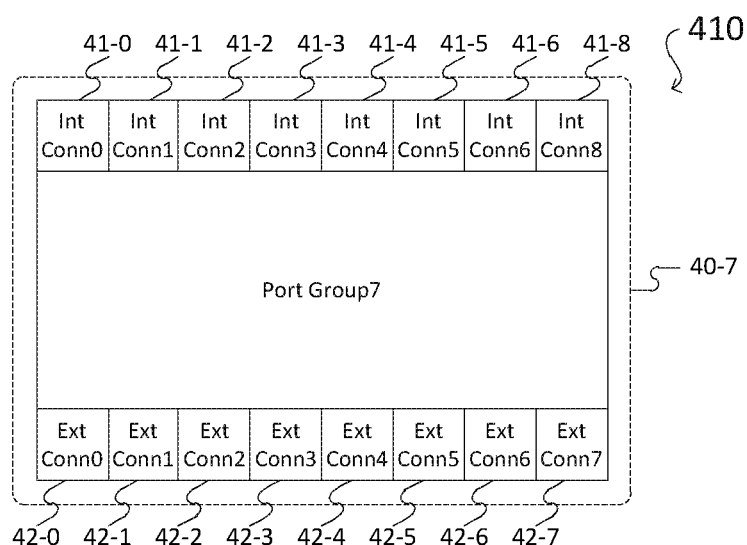
FIG. 4b illustrates the connectivity between the internal interfaces and the external interfaces of port group 7 of the 9-node ICAS module 400, in accordance with one embodiment of the present invention.

FIG. 4b illustrates in detail the connectivity between the internal interfaces and the external interfaces of a port group 7 in ICAS module 400, in accordance with the present invention. As shown in FIG. 4b, in one embodiment, the external interfaces are connected one-to-one to the internal interfaces sequentially in the index order (For example, for port group 7, external interfaces 42-0 to 42-7 are sequentially connected to internal interfaces 41-0 to 41-6 and 41-8). Therefore, for port group i, external interfaces 0-7 are connected to internal interfaces 0, . . . , i−1, i+1, . . . , and 8 respectively. Therefore, it can be easily seen that any pair of port groups x and y are connected through internal interface x of port group y and internal interface y of port group x. This indexing scheme allows an external switching device to assign routes for data packets using the internal interface indices of the source port group and destination port group. No congestion condition (e.g., due to hash collision, aggregation model, or strict-sense blocking) can occur between any pair of port groups.

The internal interconnection between the port groups of the ICAS module can be realized via an optical media to achieve a full mesh structure. The optical media may be an optical fiber and/or 3D MEMS. The 3D MEMS uses a controllable micro-mirror to create an optical path to achieve a full mesh structure. In both of these implementations MPO connectors are used. Alternatively, the ICAS module may also be electrically implemented using circuits. In this manner, the port groups of the ICAS module are soldered or crimped onto a PCB using connectors that support high-speed differential signals and impedance matching. The interconnection between the port groups is implemented using a copper differential pair on the PCB. Since signal losses significantly vary between different grades of high-speed differential connectors and between copper differential pairs on different grades of PCBs, an active chip is usually added at the back end of the connector to restore and enhance the signal to increase the signal transmission distance on the PCB. Housing the ICAS module in a 1 U to multi-U rackmount chassis will form a 1 U to multi-U interconnection device. The ICAS-based interconnection devices are then interconnected with switching devices to form a full mesh non-blocking network. This novel network will be explained in detail hereunder in a plurality of embodiments. When the ICAS module of the 1 U to multi-U interconnection device is optically implemented (based on optical fiber and 3D MEMS), MPO-MPO cables are used to connect the ICAS-based interconnection devices and the switching devices. When the ICAS module of the 1 U to multi-U interconnection device is electrically implemented as circuits (based on PCB+chip), DAC direct connection cables or AOC active optical cables are used to connect the ICAS-based interconnection devices and the switching devices.

As switching in ICAS module 400 is achieved passively by its connectivity, no power is dissipated in performing the switching function. Typical port group-to-port group delay through an ICAS passive switch is around 10 ns (e.g., 5 ns/meter, for an optical fiber), making it very desirable for a data center application, or for big data, AI and HPC environments.

The indexing scheme of external-to-internal connectivity in ICAS module 400 of FIG. 4a is summarized in Table 2 below:

TABLE 2

| ICAS Port Group | Index of External Interface | | | | | | | |
|---|---|---|---|---|---|---|---|---|
| | 0 | 1 | 2 | 3 | 4 | 5 | 6 | 7 |
| 0 | 1 | 2 | 3 | 4 | 5 | 6 | 7 | 8 |
| 1 | 0 | 2 | 3 | 4 | 5 | 6 | 7 | 8 |
| 2 | 0 | 1 | 3 | 4 | 5 | 6 | 7 | 8 |
| 3 | 0 | 1 | 2 | 4 | 5 | 6 | 7 | 8 |
| 4 | 0 | 1 | 2 | 3 | 5 | 6 | 7 | 8 |
| 5 | 0 | 1 | 2 | 3 | 4 | 6 | 7 | 8 |
| 6 | 0 | 1 | 2 | 3 | 4 | 5 | 7 | 8 |
| 7 | 0 | 1 | 2 | 3 | 4 | 5 | 6 | 8 |
| 8 | 0 | 1 | 2 | 3 | 4 | 5 | 6 | 7 |

Figure 5A:
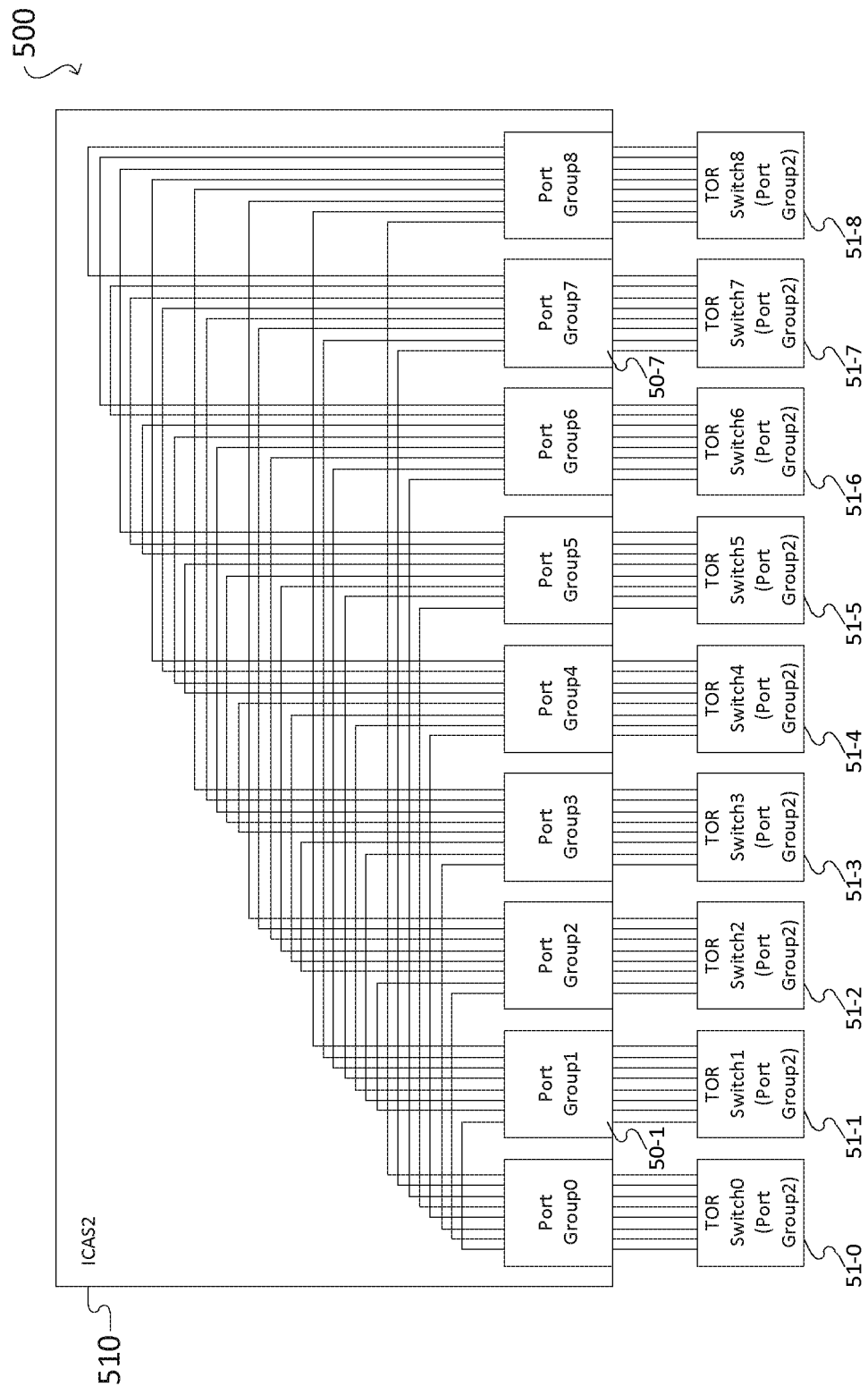
FIG. 5a shows ICAS module 500 connecting port group 2 of each of TOR switches 51-0 to 51-8 in a full mesh topology, in accordance with one embodiment of the present invention.

FIG. 5a shows network 500, in which ICAS module 510 and port group 2 of each of TOR switches 51-0 to 51-8 interconnects in a full mesh topology, in accordance with one embodiment of the present invention.

Figure 5B:
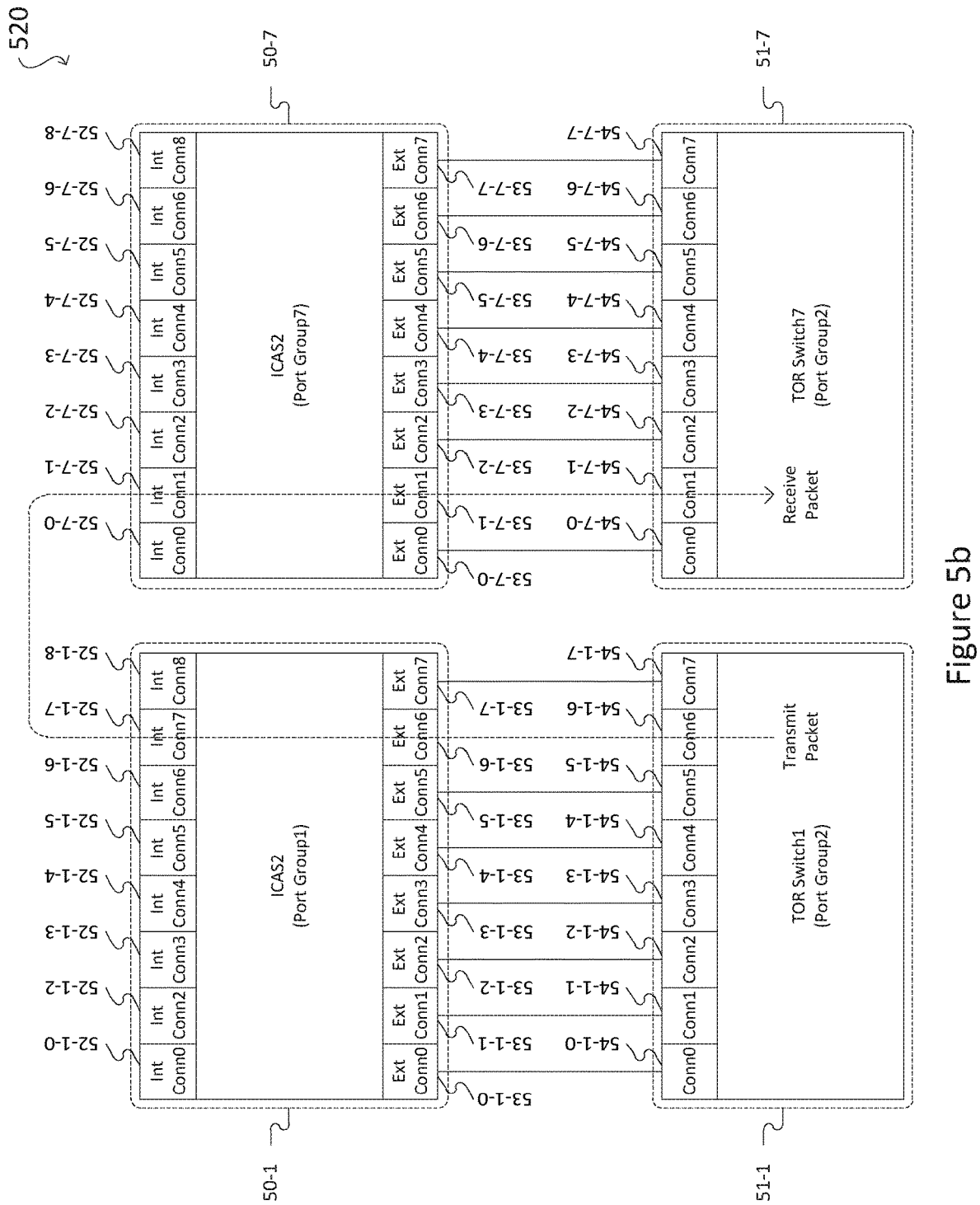
FIG. 5b illustrates, in the full mesh topology network 500 of FIG. 5a, port group 2 of TOR switch 51-1 routing a data packet to port group 2 of TOR switch 51-7 through internal interface 52-1-7 of port group 50-1 and internal interface 52-7-1 of port group 50-7 of ICAS2 module 500, in accordance with one embodiment of the present invention.

As illustrated in FIG. 5b, in an ICAS module 510 in the full mesh topology network 500 of FIG. 5a, port group 51-1 of TOR switch 1 routes a data packet to port group 51-7 of TOR switch 7 through external interface 53-1-6 and internal interface 52-1-7 of port group 50-1 of ICAS module 510, and internal interface 52-7-1 and external interface 53-7-1 of port group 50-7 of ICAS module 510, in accordance with one embodiment of the present invention. As shown in FIG. 5b, TOR switch 51-1, which is connected to port group 50-1 of ICAS module 510, receives a data packet with a destination reachable through internal port group 52-1-7 of ICAS module 510. TOR switch 51-1 has a port group that includes 8 interfaces 54-1-0 to 54-1-7 (provided as two QSFP ports) mapping one-to-one to external interfaces 53-1-0 to 53-1-7 of port group 50-1 of ICAS module 510, which in turn maps one-to-one to internal interfaces 52-1-0, 52-1-2 to 52-1-8 in sequential order of port group 50-1 of ICAS module 510. TOR switch 51-7 has a port group that includes 8 interfaces 54-7-0 to 54-7-7 (provided as two QSFP ports) mapping one-to-one to external interfaces 53-7-0 to 53-7-7 of port group 50-7 of ICAS module 510, which in turn maps one-to-one to internal interfaces 52-7-0 to 52-7-6 and 52-7-8 in sequential order of port group 50-7 of ICAS module 510. Each interface in a TOR switch port may be a 10G interface, for example. As port groups 50-1 and 50-7 of ICAS module 510 are connected through the port groups' corresponding internal interfaces 52-1-7 and 52-7-1, TOR switch 51-1 sends the data packet through its interface 54-1-6 to external interface 53-1-6 of ICAS module 510. Since the connectivity in the ICAS module 510 adopts a full mesh topology, the data packet is routed to external interface 53-7-1 of ICAS module 510.

In full mesh topology network 500, the interfaces of each TOR switch is regrouped into port groups, such that each port group contains 8 interfaces. To illustrate this arrangement, port group 2 from each TOR switch connects to ICAS module 510. As each TOR switch has a dedicated path through ICAS module 510 to each of the other TOR switches, no congestion can result from two or more flows from different source switches being routed to the same port of destination switch (the "Single-Destination-Multiple-Source Traffic Aggregation" case). In that case, for example, when TOR switches 51-0 to 51-8 each have a 10-G data flow that has TOR switch 51-0 as destination, all the flows would be routed on paths through respective interfaces. Table 3 summarizes the separate designated paths:

TABLE 3

| Source | | ICAS Source Internal | | ICAS Destination Internal | | Destination |
|---|---|---|---|---|---|---|
| T1.p2.c0 | ↔ | ICAS2.p1.c0 | ↔ | ICAS2.p0.c1 | ↔ | T0.p2.c0 |
| T2.p2.c0 | ↔ | ICAS2.p2.c0 | ↔ | ICAS2.p0.c2 | ↔ | T0.p2.c1 |
| T3.p2.c0 | ↔ | ICAS2.p3.c0 | ↔ | ICAS2.p0.c3 | ↔ | T0.p2.c2 |
| T4.p2.c0 | ↔ | ICAS2.p4.c0 | ↔ | ICAS2.p0.c4 | ↔ | T0.p2.c3 |
| T5.p2.c0 | ↔ | ICAS2.p5.c0 | ↔ | ICAS2.p0.c5 | ↔ | T0.p2.c4 |
| T6.p2.c0 | ↔ | ICAS2.p6.c0 | ↔ | ICAS2.p0.c6 | ↔ | T0.p2.c5 |
| T7.p2.c0 | ↔ | ICAS2.p7.c0 | ↔ | ICAS2.p0.c7 | ↔ | T0.p2.c6 |
| T8.p2.c0 | ↔ | ICAS2.p8.c0 | ↔ | ICAS2.p0.c8 | ↔ | T0.p2.c7 |

In other words, in Table 3, the single-connection data between first layer switch i connected to the port group with index i and first layer switch j connected to the port group with index j is directly transmitted through the interface with index j of the port group with index i and the interface with index i of the port group with index j.

In Table 3 (as well as in all Tables herein), the switch source and the switch destination are each specified by 3 values: $Ti.p_j.c_k$, where $T_i$ is the TOR switch with index i, $p_j$ is the port group with index j and $c_k$ is the interface with index k. Likewise, the source interface and destination interface in ICAS module 500 are also each specified by 3 values: $ICASj.p_i.c_k$, where ICASj is the ICAS module with index j, $p_i$ is the port group with index i and $c_k$ is the internal or external interface with index k.

An ICAS-based network is customarily allocated so that when its port groups are connected to port group i from all TOR switches the ICAS will be labeled as ICASi with index i.

Congestion can also be avoided in full mesh topology network 500 with a suitable routing method, even when a source switch receives a large burst of aggregated data (e.g., 80 Gbits per second) from all its connected servers to be routed to the same destination switch (the "Port-to-Port Traffic Aggregation" case). In this case, it is helpful to imagine the TOR switches as consisting of two groups: the source switch i and the rest of the switches 0 to i−1, i+1 to 8. The rest of the switches are herein collectively referred to as the "fabric group". Suppose TOR switch 51-1 receives 80 Gbits per second (e.g., 8 10G flows) from all its connected servers all designating to destination TOR switch 51-0. The routing method for the Port-to-Port Traffic Aggregation case allocates the aggregated traffic to its 8 10G interfaces with port group 51-1 as in FIG. 5a, such that the data packets in each 10G interface is routed to a separate TOR switch in the fabric group (Table 4A):

TABLE 4A

| Source | | ICAS Source Internal | | ICAS Destination Internal | | Destination |
|---|---|---|---|---|---|---|
| T1.p2.c0 | ↔ | ICAS2.p1.c0 | ↔ | ICAS2.p0.c1 | ↔ | T0.p2.c0 |
| T1.p2.c1 | ↔ | ICAS2.p1.c2 | ↔ | ICAS2.p2.c1 | ↔ | T2.p2.c1 |

TABLE 4A-continued

| Source | | ICAS Source Internal | | ICAS Destination Internal | | Destination |
|---|---|---|---|---|---|---|
| T1.p2.c2 | ↔ | ICAS2.p1.c3 | ↔ | ICAS2.p3.c1 | ↔ | T3.p2.c1 |
| T1.p2.c3 | ↔ | ICAS2.p1.c4 | ↔ | ICAS2.p4.c1 | ↔ | T4.p2.c1 |
| T1.p2.c4 | ↔ | ICAS2.p1.c5 | ↔ | ICAS2.p5.c1 | ↔ | T5.p2.c1 |
| T1.p2.c5 | ↔ | ICAS2.p1.c6 | ↔ | ICAS2.p6.c1 | ↔ | T6.p2.c1 |
| T1.p2.c6 | ↔ | ICAS2.p1.c7 | ↔ | ICAS2.p7.c1 | ↔ | T7.p2.c1 |
| T1.p2.c7 | ↔ | ICAS2.p1.c8 | ↔ | ICAS2.p8.c1 | ↔ | T8.p2.c1 |

Note that the data routed to TOR switch 51-0 has arrived at its designation and therefore would not be routed further. Each TOR switch in the fabric group, other than TOR switch 51-0, then allocates its interface 0 for forwarding its received data to TOR switch 51-0 (Table 4B):

TABLE 4B

| Source | | ICAS Source Internal | | ICAS Destination Internal | | Destination |
|---|---|---|---|---|---|---|
| — | ↔ | — | ↔ | — | ↔ | — |
| T2.p2.c0 | ↔ | ICAS2.p2.c0 | ↔ | ICAS2.p0.c2 | ↔ | T0.p2.c1 |
| T3.p2.c0 | ↔ | ICAS2.p3.c0 | ↔ | ICAS2.p0.c3 | ↔ | T0.p2.c2 |
| T4.p2.c0 | ↔ | ICAS2.p4.c0 | ↔ | ICAS2.p0.c4 | ↔ | T0.p2.c3 |
| T5.p2.c0 | ↔ | ICAS2.p5.c0 | ↔ | ICAS2.p0.c5 | ↔ | T0.p2.c4 |
| T6.p2.c0 | ↔ | ICAS2.p6.c0 | ↔ | ICAS2.p0.c6 | ↔ | T0.p2.c5 |
| T7.p2.c0 | ↔ | ICAS2.p7.c0 | ↔ | ICAS2.p0.c7 | ↔ | T0.p2.c6 |
| T8.p2.c0 | ↔ | ICAS2.p8.c0 | ↔ | ICAS2.p0.c8 | ↔ | T0.p2.c7 |

In other words, at least one multi-connection data between the first layer switch i connected to the port group indexed i and the first layer switch j connected to the port group indexed j is transmitted through the first layer switches connected to at least one of the port groups other than the port group with source index. The multi-connection data arriving at the destination switch will cease to be further routed and transmitted.

To put it more precisely, the multi-connection data transmission occurring between first layer switch i connected to the port group with index i and first layer switch j connected to the port group with index j includes the transmissions includes: as in Table 4A, the first layer switch i is connected, via a plurality of interfaces of the port group with a plurality of index i, to a plurality of first layer switches with a plurality of corresponding indexes for transmission; as in Table 4B, a plurality of the first layer switches with the indexes as shown are connected, via interfaces with index j of the port groups, to the interfaces with the indexes as shown of the port groups with index j of the first layer switches for transmission; those transmissions that arrive at a destination switch will stop routing.

Thus, the full mesh topology network of the present invention provides performance that is in stark contrast to prior art network topologies (e.g., fat tree), in which congestions in the fabric switch cannot be avoided under Single-Destination-Multiple-Source Traffic Aggregation and Port-to-Port Traffic Aggregation cases.

Also, as discussed above, when TOR switches 51-0 to 51-8 abide by the rule m≥2n−2, where m is the number of network-side interfaces (e.g., the interfaces with a port group in ICAS module 500) and n is the number of the TOR switch's input interfaces (e.g., interfaces to the servers within the data center), a strict blocking condition is avoided. In other words, a static path is available between any pair of input interfaces under any traffic condition.

Avoiding such a blocking condition is essential in a circuit-switched network, but is not necessarily significant in a flow-based switched network.

Figure 6A:
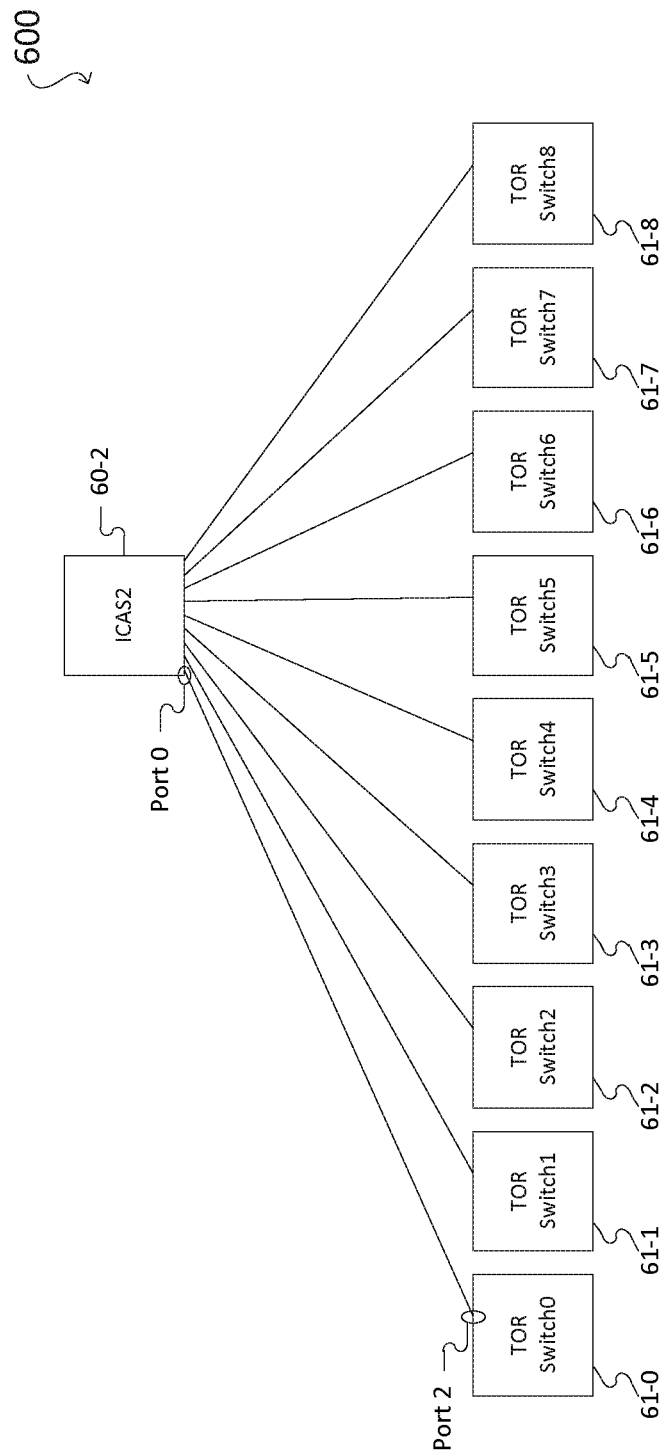
Figure 6B:
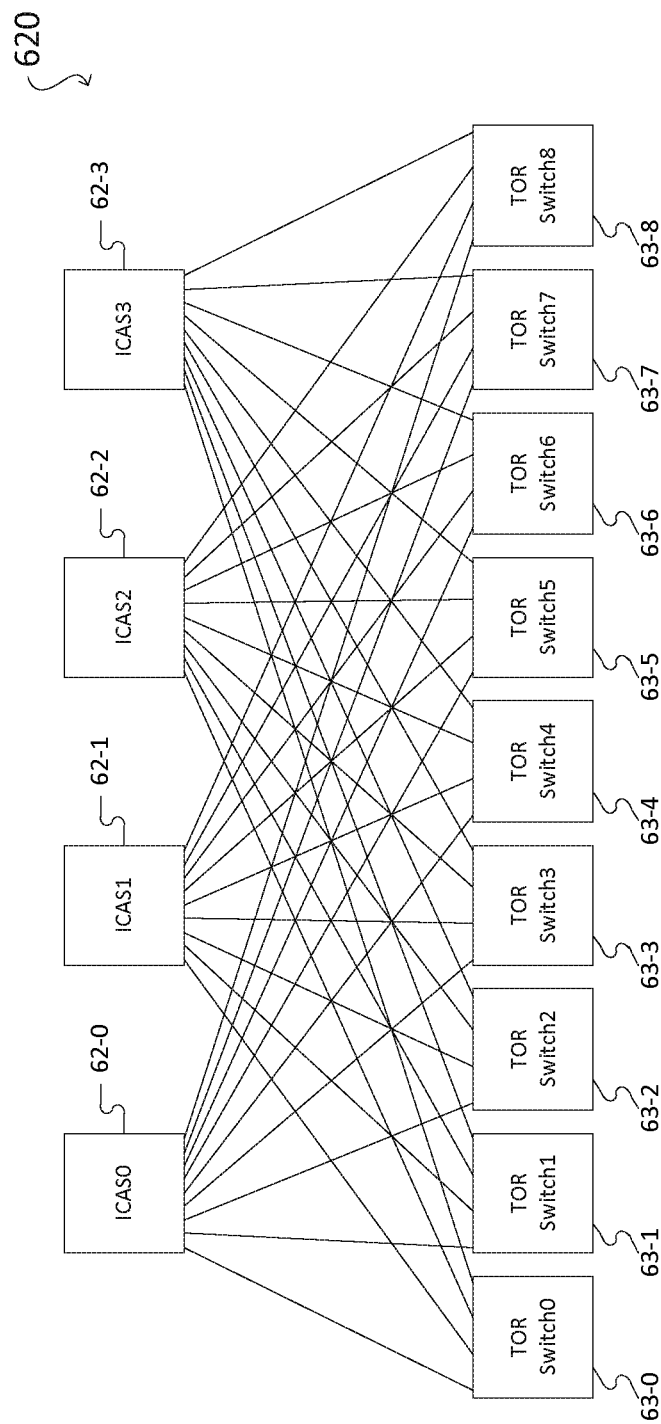
FIG. 6b shows network 620, after additional ICAS modules are added to network 600 of FIG. 6a, so as to provide greater bandwidth and path diversity.

In the full mesh topology network 500 of FIG. 5*a*, each port group with 8 interfaces of ICAS module 500 connects to a port group with 8 interfaces (e.g., 8 10-G interfaces) of a corresponding TOR switch. Full mesh topology network 500 of FIG. 5*a* may be redrawn in a more compact form in FIG. 6*a*, with a slight modification. FIG. 6*a* illustrates ICAS2 module 60-2 interconnecting to port group 2 of each of TOR switches 61-0 to 61-8. In FIG. 6*a*, the interfaces between port group 2 of TOR switch 61-0 and port group 0 of ICAS module 60-2 (now labeled 'ICAS2') are represented as a single line (e.g., the single line between port group 2 of TOR switch 61-0 and port group 0 of ICAS module 60-2). Such a line, of course, represents all 8 eight interfaces between the TOR switch and a corresponding port group in ICAS module 60-2. This is exactly the case in FIG. 6*b* where each TOR switch 63-0 to 63-8 is shown also to have 4 port groups, to allow configuring network 620 of FIG. 6*b*, where three additional ICAS modules 62-0, 62-1 and 62-3 in addition to 62-2 and corresponding interfaces are added to network 600 of FIG. 6*a*.

In full mesh topology network 500, uniform traffic may be spread out to the fabric group and then forwarded to its destination. In network 620 of FIG. 6*b*, the additional ICAS modules may be used to provide greater bandwidth. So long as the additional port groups are available in the TOR switches, additional ICAS modules may be added to the network to increase path diversity and bandwidth.

Figure 1A:
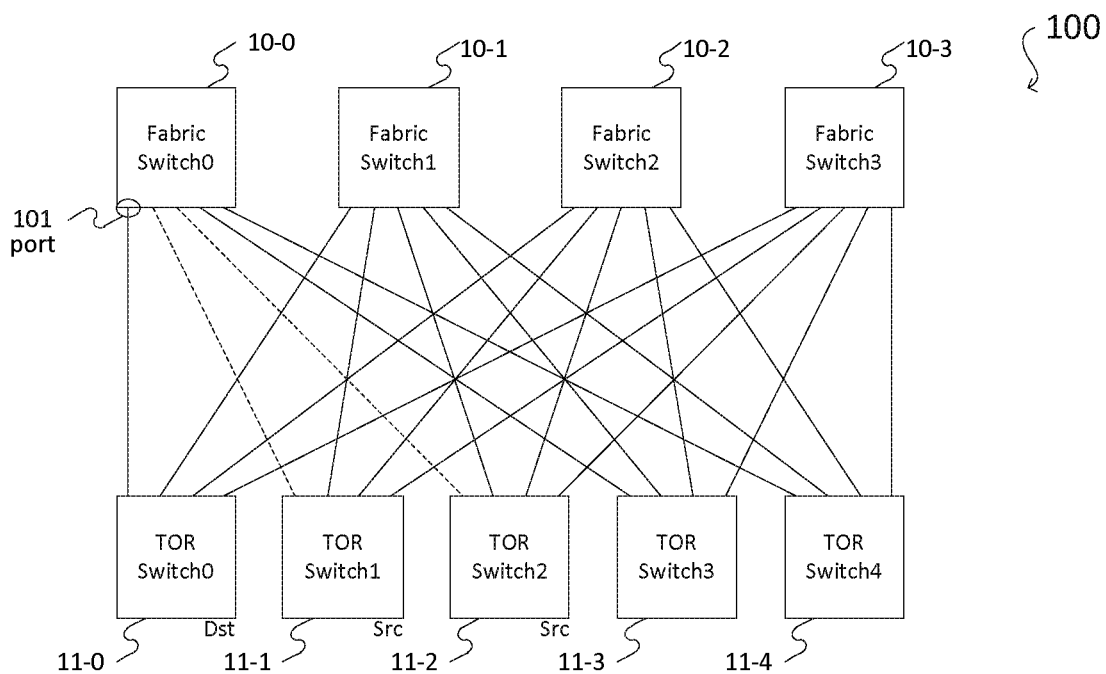
FIG. 1a illustrates congestion due to hash collision in a fat tree network under ECMP.
Figure 1B:
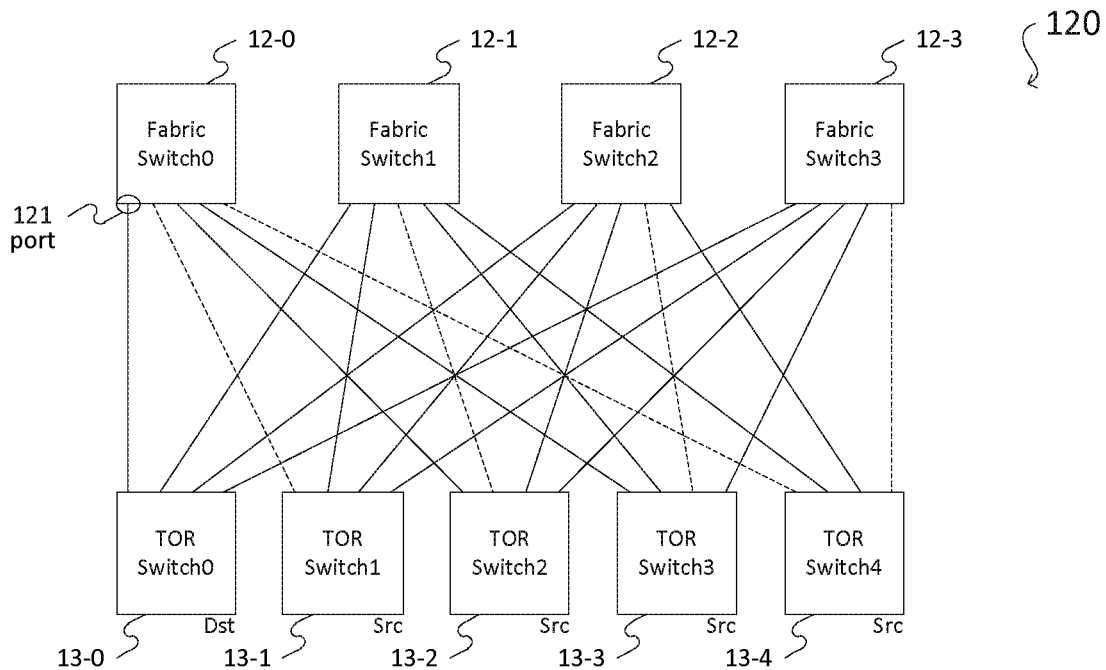
FIG. 1b illustrates aggregation congestion in a fat tree network topology.
Figure 1C:
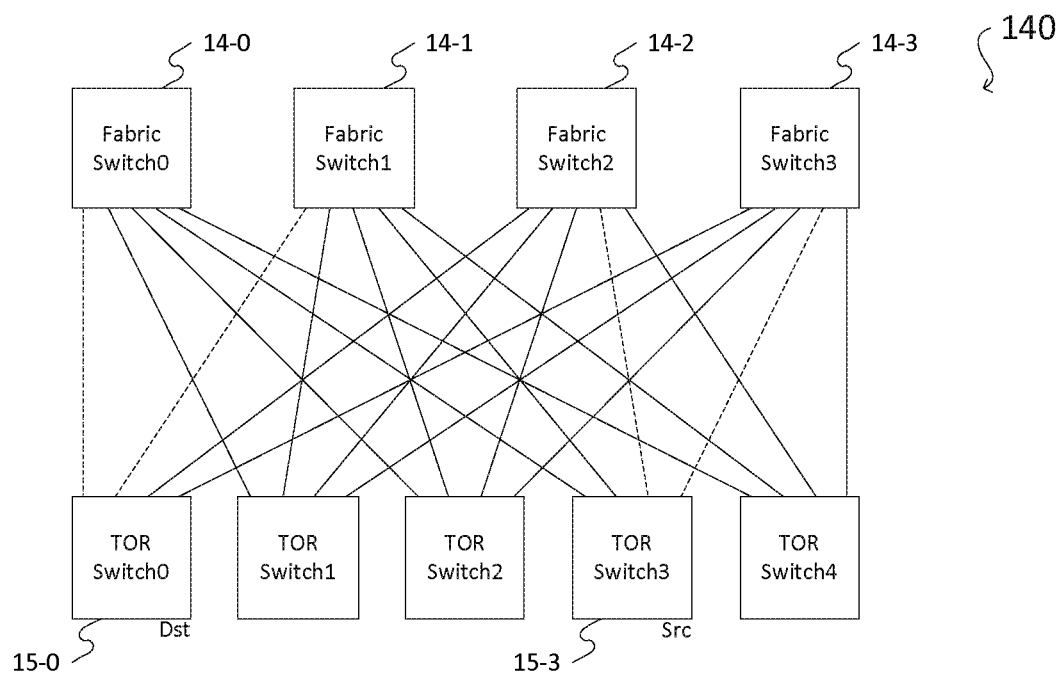
FIG. 1c illustrates congestion due to blocking condition in a fat tree network.
Figure 2A:
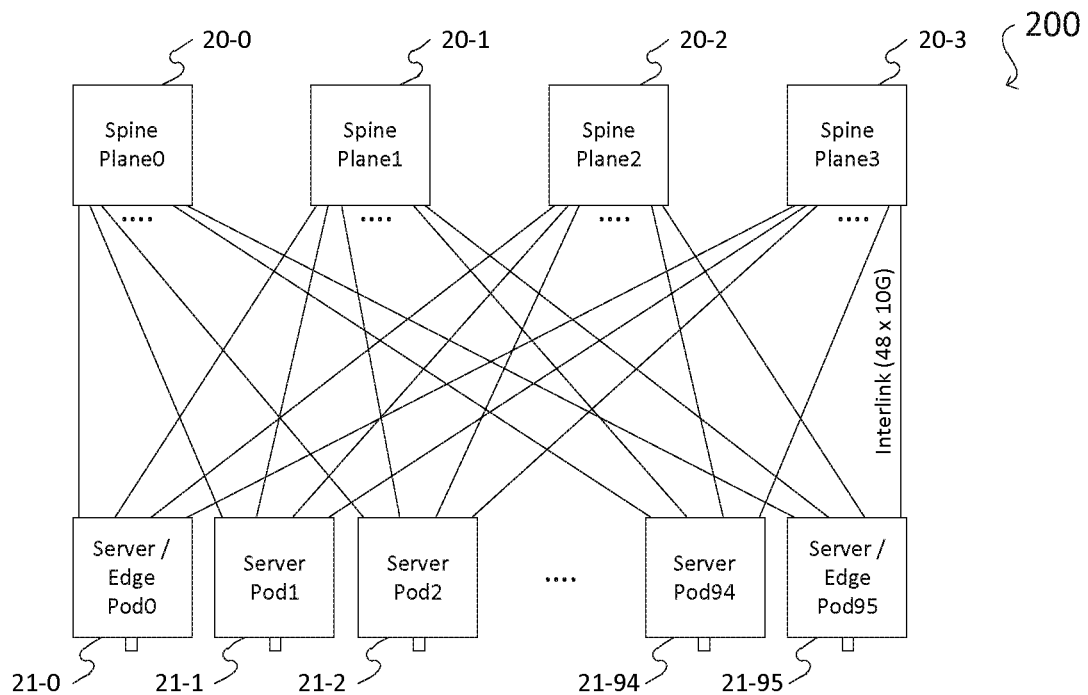
FIG. 2a shows the architecture of a state-of-the-art data center network.
Figure 2B:
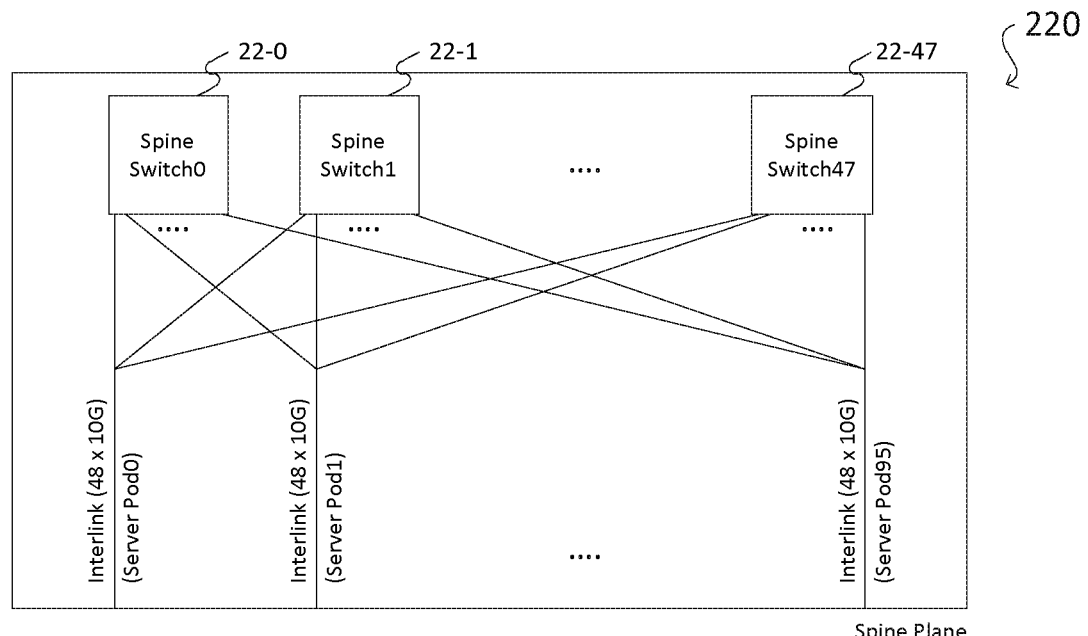
Figure 2C:
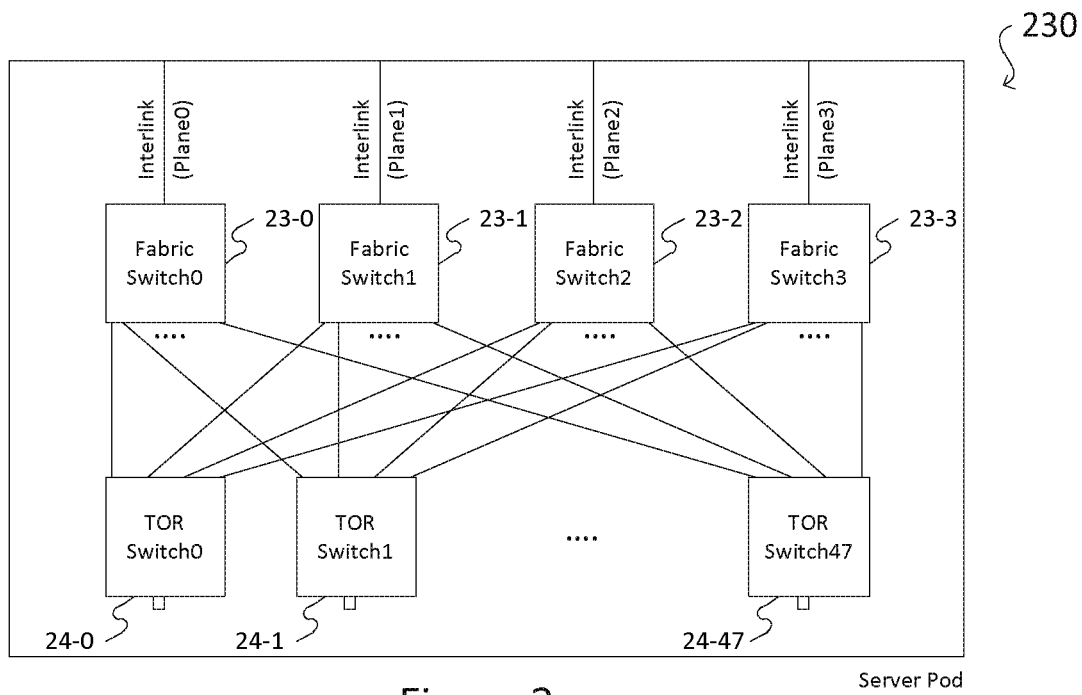
FIG. 2c shows in detail an implementation of a server pod of FIG. 2a using four fabric switches to distribute machine-to-machine traffic across 48 top-of-rack switches.
Figure 2D:
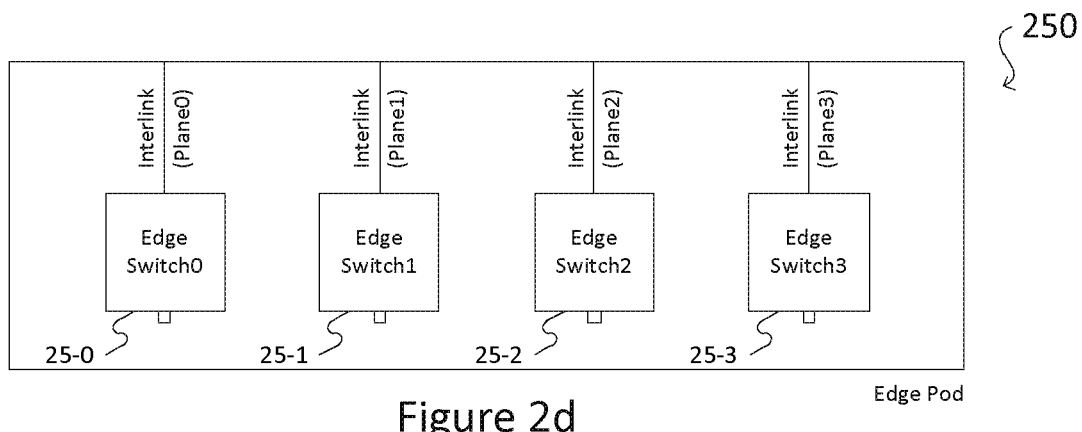
FIG. 2d shows in detail an implementation of an edge pod of FIG. 2a using four edge switches to provide interfaces for uplink to connect to external network.
Figure 7A:
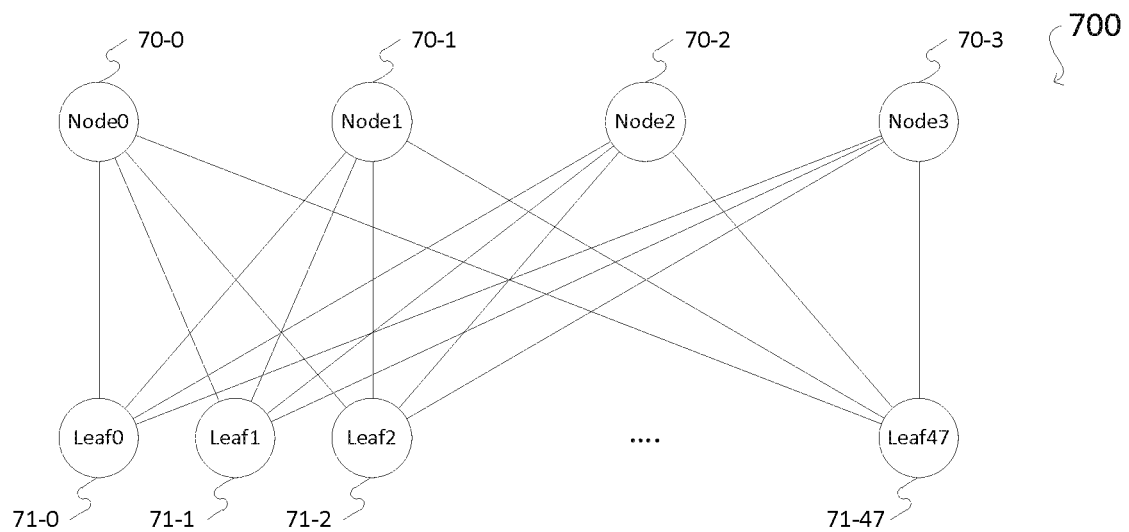
FIG. 7a shows that, in the architecture of the data center of FIG. 2a, the topology of a server pod may be reduced to a (4, 48) bipartite graph.

The inventor of the present invention investigated in detail the similarities and the differences between the full mesh topology of the present invention and other network topologies, such as the fat tree topology in the data center network of FIG. 2*a*. The inventor first observes that, in the architecture of the data center network of FIG. 2*a*, the fat tree network represented in a server pod (the "fabric/TOR topology") can be reduced to a (4, 48) bipartite graph, so long as the fabric switches merely perform an interconnect function for traffic originated among the TOR switches. This (4, 48) bipartite graph is shown in FIG. 7*a*. In FIG. 7*a*, the upper set of nodes, nodes 0-3 ("fabric nodes") 70-0 to 70-3, represent the four fabric switches in the server pod of FIG. 2*a* and the lower set of 48 nodes (i.e., leaf 0-47), labeled 71-0 to 71-47, represent the 48 TOR switches in a server pod of FIG. 2*a*.

Figure 7B:
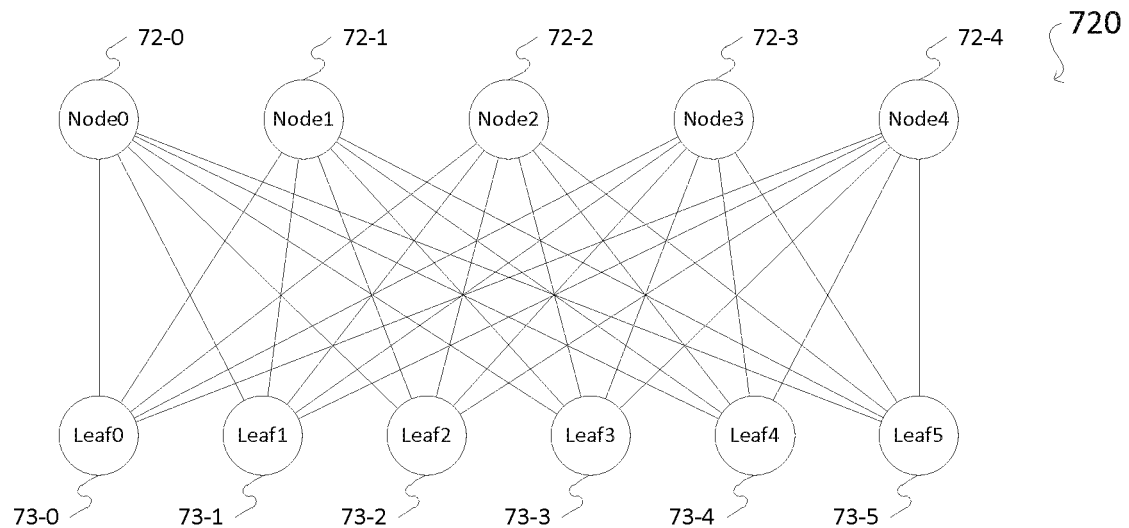
FIG. 7b shows, as an example, network 720 represented as a (5, 6) bipartite graph.
Figure 7C:
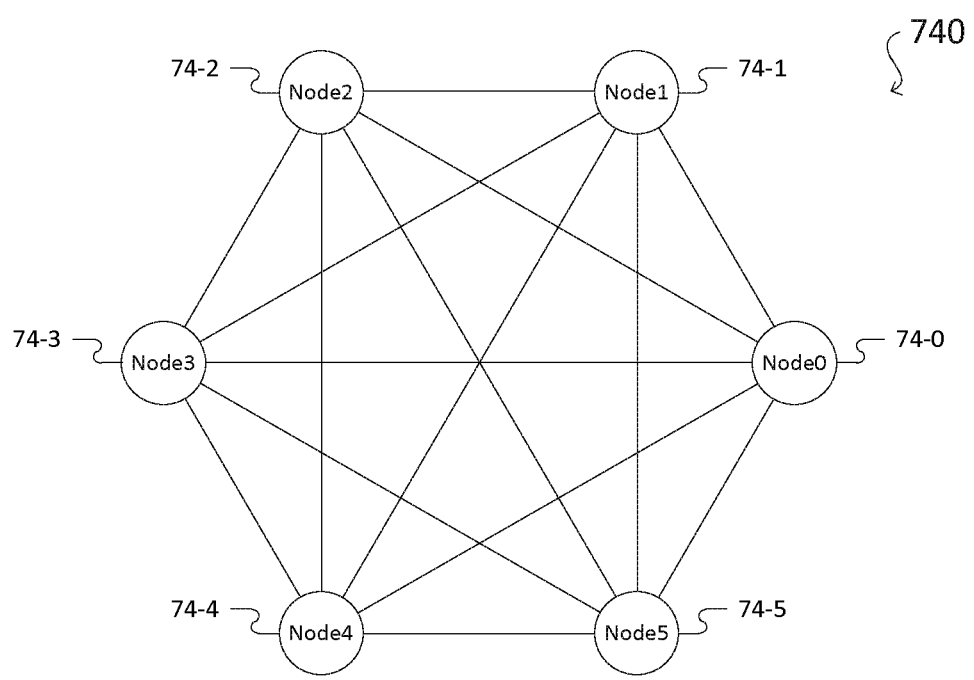
FIG. 7c shows the 6-node full mesh graph embedded in the (5, 6) bipartite graph of FIG. 7b.

The inventor discovered that an n-node full mesh graph is embedded in a fabric-leaf network represented by a bipartite graph with (n−1, n) nodes (i.e., a network with n−1 fabric nodes and n TOR switch leaves). FIG. 7*b* shows, as an example, a (5, 6) bipartite graph with 5 nodes 72-0 to 72-4 and 6 leaves 73-0 to 73-5. FIG. 7*c* shows the 6-node full mesh graph 740 with 6 nodes 74-0 to 74-5 embedded in the (5, 6) bipartite graph of FIG. 7*b*.

This discovery leads to the following rather profound results:

(a) An n-node full mesh graph is embedded in an (n−1, n)-bipartite graph; and the (n−1, n) bipartite graph and the data center Fabric/TOR topology have similar connectivity characteristics;

(b) A network in the (n−1, n) Fabric/TOR topology (i.e., with n−1 fabric switches and n TOR switches) can operate in same connectivity characteristics as a network with full mesh topology (e.g., network 500 of FIG. 5*a*);

(c) Fabric switches are unnecessary in an (n−1, n) Fabric/TOR topology network, as the fabric switches merely performs interconnecting function among the TOR switches (i.e., these fabric switches can be replaced by direct connectivity among TOR switches);

(d) A data center network based on a fat tree topology (e.g., the Fabric/TOR topology) can be improved significantly using ICAS modules.

In the following, a data center network that incorporates ICAS modules in place of fabric switches may be referred to as an "ICAS-based" data center network. An ICAS-based data center network has the following advantages:

(a) less costly, as fabric switches are not used;

(b) lower power consumption, as ICAS modules are passive;

(c) less congestion;

(d) lower latency;

(e) effectively less network layers (2 hops less for inter-pod traffic; 1 hop less for intra-pod traffic);

(f) greater scalability as a data center network.

Figure 8C:
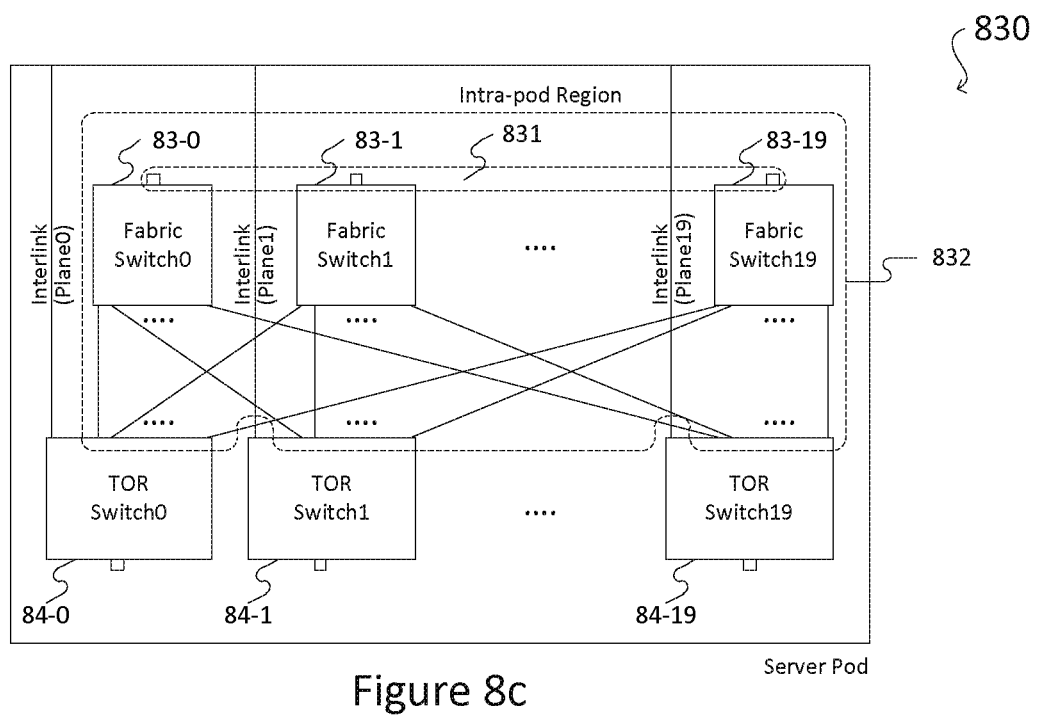
FIG. 8c shows in detail an implementation of modified server pod 830 in a (20, 21) fabric/TOR topology, having 20 fabric switches for distributing machine-to-machine traffic across 20 top-of-rack switches, in accordance with one embodiment of the present invention; the 21$^{st}$ TOR switch is removed from the modified server pod 830 so that the connections are provided as optional uplink 831 for connecting the fabric switches to an external network.

These results may be advantageously used to improve typical state-of-the-art data center networks. FIG. 8*a* shows an improved data center network 800, in accordance with one embodiment of the present invention. Data center network 800 uses the same types of components as the data center network of FIG. 2*a* (i.e., spine switches, fabric switches and TOR switches), except that the number of fabric switches are increased to one less than the number of TOR switches (FIG. 8*c* shows equal number of fabric switches and TOR switches because one of the TOR switch, the 21$^{st}$ TOR switch, is removed so that the 20 interfaces connected to it from the 20 fabric switches are provided as uplink to connect to external network).

FIG. 8*a* shows the architecture of an improved data center network, organized by three layers of switching devices—i.e., "top-of-rack" (TOR) switches and fabric switches implemented in 188 server pods 81-0 to 81-187 and spine switches implemented in 20 spine planes 80-0 to 80-19—interconnected by interlinks in a fat tree topology. An interlink refers to the network connections between a server pod and a spine plane. For example, interlink k of each of the 188 server pods is connected to spine plane k; interlink p of each of the 20 spine planes is connected to server pod p. The 20 spine planes each provide an optional uplink (e.g. uplink 801) and the 188 server pods each provide an optional uplink (e.g., uplink 802) for connection to one or more external networks. In this example, to allow comparison, the numbers of server pods and spine plane are chosen so that the improved data center network 800 and the state-of-the-art data center network 200 have the same network characteristics (2.2 Pbps total server-side bandwidth; 3:1 oversubscription ratio—server-side to network-side bandwidth ratio; Trident-II ASIC). Other configurations of the improved data center network are also possible, for instance, 32-TOR server pod or 48-TOR server pod but with higher radix switching silicon than the Trident-II ASIC.

Details of a spine plane of FIG. 8*a* are shown in FIG. 8*b*. In FIG. 8*b*, spine plane 820 consists of 20 spine switches 82-0 to 82-19 each connecting to 188 server pods. The connections from all 20 spine switches are grouped into 188 interlinks, with each interlink including a connection from each spine switch 82-0 to 82-19, for a total of 20 connections per interlink.

Details of a server pod of FIG. 8*a* are shown in FIG. 8*c*. In FIG. 8*c*, the network-side connection (as opposed to the server-side connection) of the server pod is separated into intra-pod links and inter-pod links (i.e., the interlinks). The two types of links are made independent from each other. The intra-pod region 832 consists of the intra-pod links, the 20 TOR switches 84-0 to 84-19 and the 20 fabric switches 83-0 to 83-19 interconnected by the intra-pod links in a fat tree topology. For example, connection k in each of the 20 TOR switches is connected to fabric switch k; connection p of each of the 20 fabric switches is connected to TOR switch p. 20 fabric switches each provide an optional uplink (e.g., uplink 831) to connect to an external network. The inter-pod region consists of the inter-pod links (i.e., the interlinks) and 20 TOR switches 84-0 to 84-19 on the interlink side. Each interlink provides 20 10G connections to connect to all 20 spine switches on the same spine plane. Each server pod includes a total of 20 links. For example, interlink k of each of the 188 TOR switches across the 188 server pods are connected to spine plane k; interlink p of each of the 20 spine planes are connected to server pod p. Each TOR switch provides 48×10G connections in 12×QSFP ports as downlink to connect to servers.

The data traffic through the fabric switches is primarily limited to intra-pod. The TOR switches now route both the intra-pod traffic as well as inter-pod traffic and are more complex. The independent link types achieve massive scalability in data center network implementations. (Additional independent links provided from higher radix switching ASIC may be created to achieve larger scale of connectivity objectives). Additionally, data center network 800 incorporates the full mesh topology concept (without physically incorporating an ICAS module) to remove redundant network devices and allow the use of innovative switching methods, in order to achieve a "lean and mean" data center fabric with improved data traffic characteristics.

As shown in FIG. 8c, FIG. 8b and FIG. 8a, data center network 800 includes 20×188 TOR switches and 20×188 fabric switches equally distributed over 188 server pods, and 20×20 spine switches equally distributed over 20 spine planes. In FIG. 8a, each TOR switch has 100 10G-connections (i.e., 25 QSFPs of bandwidth in 10G mode), of which 60 10G-connections are provided server-side and 40 10G-connections are provided network-side. (Among the network-side connections 20 10G-connections are used for intra-pod traffic and 20 10G-connections are used for inter-pod traffic). In each server pod, fabric switches 83-0 to 83-19 each include 21 10G-connections, of which 20 10G-connections are allocated to connect with a 10G-connection in each of TOR switches 84-0 to 84-19, and the rest being converted to provide as uplink to connect to external network. In this manner, fabric switches 83-0 to 83-19 support the intra-pod region data traffic and the uplinks in the server pod by a 21-node full mesh topology (with the uplinks of fabrics switches 0-19 collectively seen as one node). Using a suitable routing algorithm, such as any of those described above in conjunction with Single-Source-Multiple-Destination Traffic Aggregation and Port-to-Port Traffic Aggregation, network congestion can be eliminated from all fabric switches.

As the network in the intra-pod region of each server pod can operate in the same connectivity characteristics as a full mesh topology network, all the 20 fabric switches of the server pod may be replaced by an ICAS module. ICAS-based data center network 900, resulting from substituting fabric switches 83-0 to 83-19 of data center network 800, is shown in FIG. 9a. To distinguish from the server pod of data center network 800, a server pod with its fabric switches replaced by an ICAS module is referred to as an "ICAS pod."

FIG. 9a shows the architecture of an ICAS-based data center network, organized by three layers of devices—i.e., "top-of-rack" (TOR) switches, ICAS module implemented in 188 server pods 91-0 to 91-187 and spine switches implemented in 20 spine planes for 90-0 to 90-19 —interconnected by interlinks in a fat tree topology. 20 spine planes provide optional uplinks 901 and 188 ICAS pods provide optional 188×20×10G uplinks 902 for connecting to an external network. The number of network devices in the data center network should be interpreted as illustrative only.

Details of a spine plane of FIG. 9a are shown in FIG. 9b according to one embodiment. In FIG. 9b, spine plane 920 includes 20 spine switches 92-0 to 92-19 and a fanout cable transpose rack 921. The fanout cable transpose rack contains: k first port groups 923 are connected to corresponding port groups of k spine switches through a plurality of first MPO-MPO fiber cables, where each first port group including $\lceil p/m \rceil$ first MPO adapters, and each first MPO adapter including m interfaces (where each interface includes one transmit fiber channel and one receive fiber channel), and a plurality of first MPO fiber adapters from the k port groups 923 are connect to LC optical fiber adapter mounting panel 922 through a plurality of first MPO-LC fanout fiber cables, where k=20, p=188, m=4, and $\lceil \; \rceil$ is a ceiling function; the fanout cable transpose rack 921 includes p second port groups 924 that are connected to a plurality of second MPO-MPO fiber cables to form interlinks 99-0 to 99-187, each second port group contains $\lceil k/m \rceil$ second MPO fiber adapters, each of which includes m interfaces (where each interface includes one transmit fiber channel and one receive fiber channel), and a plurality of second MPO fiber adapters from the p port groups 924 are connected to LC optical fiber adapter mounting panel 922 through a plurality of the second MPO-LC fanout cables; a plurality of first MPO-LC fanout fiber cables cross-connect a plurality of second MPO-LC fanout fiber cables on the LC fiber adapter mounting panel 922, through cross-connection, all connections from k spine switches 92-0 to 92-19 are reorganized into p interlinks 99-0 to 99-187, each interlink includes one connection from each of the spine switches 92-0 to 92-19, each interlink contains k connections in total.

That is, on one side of the fanout cable transpose rack 921 is k first port groups 923, each first port group has $\lceil p/m \rceil$ of first MPO adapters, where $\lceil \; \rceil$ is a ceiling function, each port groups connects to a corresponding port group of a spine switch through the $\lceil p/m \rceil$ first MPO-MPO cables. On the other side of the fanout cable transpose rack 921 is p second port groups 924, each second port group has $\lceil k/m \rceil$ of second MPO adapters, where $\lceil \; \rceil$ is an ceiling function, each port group connects to 5 second MPO-MPO cables to form an interlink to the ICAS pod.

As pointed out earlier in this detailed description, the state-of-the-art data centers and switch silicon are designed with 4 interfaces (TX, RX) at 10 Gb/s or 25 Gb/s each per port in mind. Switching devices are interconnected at the connection level in ICAS-based data center. In such a configuration, a QSFP cable coming out from a QSFP transceiver is separated into 4 interfaces, and 4 interfaces from different QSFP transceivers are combined in a QSFP cable for connecting to another QSFP transceiver. Also, a spine plane may interconnect a large and varying number of ICAS pods (e.g., in the hundreds) because of the scalability of an ICAS-based data center network. Such a cabling scheme is more suitable to be organized in a fanout cable transpose rack (e.g., fanout cable transpose rack 921), which may be one or multiple racks and be integrated into the spine planes. Specifically, the spine switches and the TOR switches may each connect to the fanout cable transpose rack with QSFP straight cables. Such an arrangement simplifies the cabling in a data center. FIG. 9b illustrates such an arrangement for data center network 900 of FIG. 9a.

In the embodiment shown in FIG. 9b, the first and the second optical fiber adapters are MPO adapters, the first and the second cables are MPO-MPO cables, the first and the second fanout cables are MPO-LC fanout cables, the mounting panel is LC optical fiber adapter mounting panel. One skilled in the art would understand that different types of optical fiber adapters/cable/optical fiber adapter mounting panel may also be used, such as FC, SC, LC, and MU.

Figure 9C:
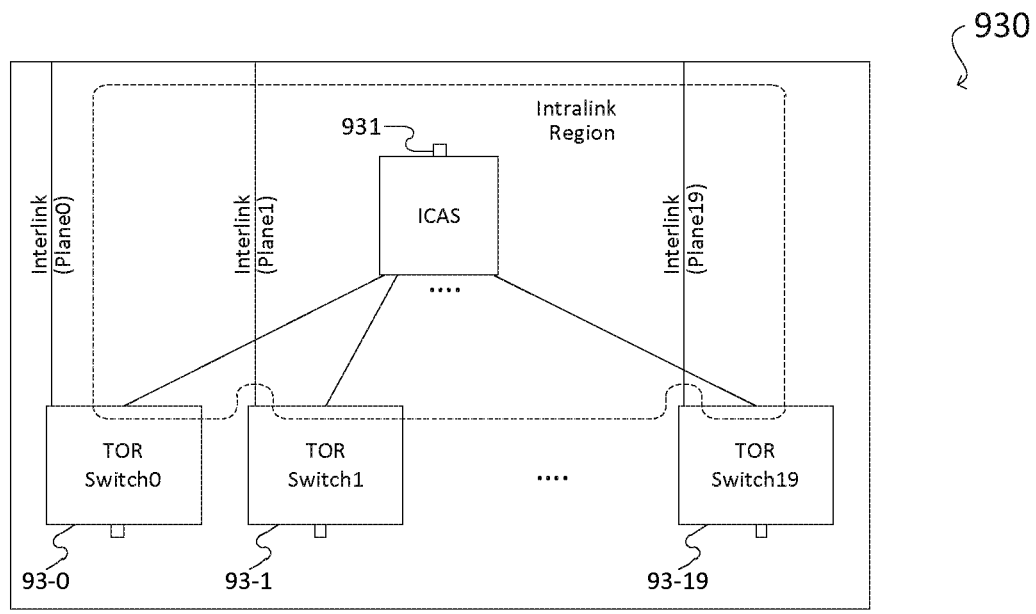
FIG. 9c shows in detail an implementation of ICAS pod 930, which is achieved by replacing fabric switches 83-0 to 83-19 in server pod 830 of FIG. 8c, according to one embodiment of the present invention; each ICAS pod provides 20×10G uplinks 932 for connecting to an external network.

Details of an ICAS pod of FIG. 9a are shown in FIG. 9c. In FIG. 9c, the network side interface (as opposed to the server-side interface) of an ICAS pod is divided into intra-pod links (i.e. intralinks) and inter-pod links (i.e., interlinks) and the two types of links are made independent from each other. The intra-pod region consists of intralinks between the 20 TOR switches 93-0 to 93-10 19 and ICAS module 931, interconnected by 10G connections in a full mesh topology. Each ICAS module may provide 20 10G uplinks 932 to connect to one or more external networks. The inter-pod region consists of interlinks. ICAS pod may comprise 20 TOR switches 93-0 to 93-19 each connects one of 20 spine planes by interlinks, respectively; each interline comprising 20 connections each connects one of 20 spine switches in a spine plane, respectively. For example, interlink k of each of 188 TOR switches across the 188 ICAS pods is connected to spine plane k; interlink p of each of the 20 spine planes is connected to server pod p. Each TOR switch provides 60×10G interfaces in 15×QSFP ports as a downlink for connecting to servers.

The data traffic through the ICAS module is primarily limited to intra-pod. The TOR switches now perform routing for the intra-pod traffic as well as inter-pod traffic and are more complex. The independent link types achieve massive scalability in data center network implementations. (Additional independent link provided from higher radix switching ASIC may be created to achieve a larger scale of connectivity objectives).

As shown in FIG. 9c, FIG. 9b and FIG. 9a, each TOR switch allocates 20×10G-interfaces (5×QSFPs in 10G mode) to connect to its associated ICAS module (e.g., ICAS module 931) to support intra-pod traffic, and 5 QSFPs in 10G mode (20 10G-interfaces) to connect to the fiber transpose rack to support inter-pod traffic. As shown in FIG. 9c, each ICAS pod includes 20×5 QSFP transceivers for intra-pod traffic, connected by 100 QSFP straight cables, and 20×15 QSFP (10G mode) transceivers for server traffic, for a total 500 QSFP transceivers. The 20 TOR switches in an ICAS pod may be implemented by 20 Trident II ASICs. Although 20 TOR switches are shown in each ICAS pod in FIG. 9c, the ICAS module is scalable to connect up to 48 TOR switches in an ICAS pod (based on 32×QSFP Trident-II+ switch ASIC).

Together, the ICAS pods and the spine planes form a modular network topology capable of accommodating hundreds of thousands of 10G-connected servers, scaling to multi-petabit bisection bandwidth, and covering a data center with congestion improved and non-oversubscribed rack-to-rack performance.

Figure 9D:
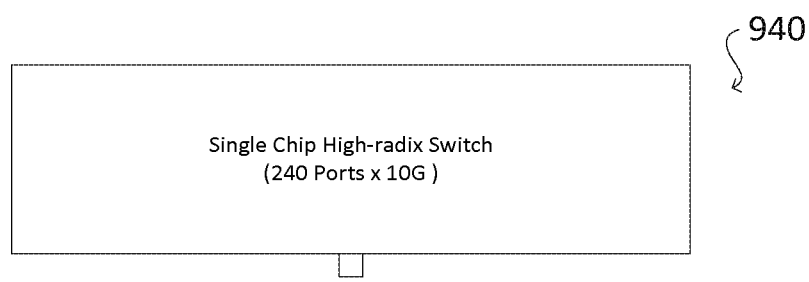
FIG. 9d illustrates a spine switch implemented with a single chip high-radix (i.e., a high port count) switching integrated circuit; such a spine switch makes use of the highest port count switching integrated circuit available at present time.

According to one embodiment of the present invention, a spine switch can be implemented using a high-radix (e.g., 240×10G) single chip switching device, as shown in FIG. 9d. Single-chip implementation saves the cost of extra transceivers, cables, rack space, latency and power consumption than multi-unit (rack unit) chassis-based switching device and stackable switching device implementations. The disadvantage of the single-chip spine switch approach is its network scalability, which limits the system to 240 ICAS pods at this time. As mentioned above, the semiconductor implementation limits the scale of a high-radix switching integrated circuit.

To overcome the limitation on the port count of the silicon chip, one or more 1 U to multi-U rackmount chassis each packaged with one or more ICAS modules, and a plurality of 1 U rackmount chassis each packaged with one or more switching devices, can be stacked up in one or more racks, interconnected, to form a higher-radix (i.e. high network port count) stackable spine switching device (e.g., ICAS-based stackable switching device). Each ICAS module is connected to the plurality of switching devices, such that the ICAS module interconnects at least some interfaces of at least some port groups of different switching devices to form a full mesh non-blocking interconnection. The interfaces of the rest of the at least some port groups for interconnecting different switching devices are configured as an uplink. When the ICAS-module-based 1 U to multi-U rackmount chassis are optically implemented (based on optical fiber and 3D MEMS), MPO-MPO cables may be used to connect the ICAS-based interconnection devices and the switching devices. When the ICAS-module-based 1 U to multi-U rackmount chassis are electrically implemented as circuits (based on PCB+chip), DAC direct connection cables or AOC active optical cables may be used to connect the ICAS-based interconnection devices and the switching devices.

Figure 9E:
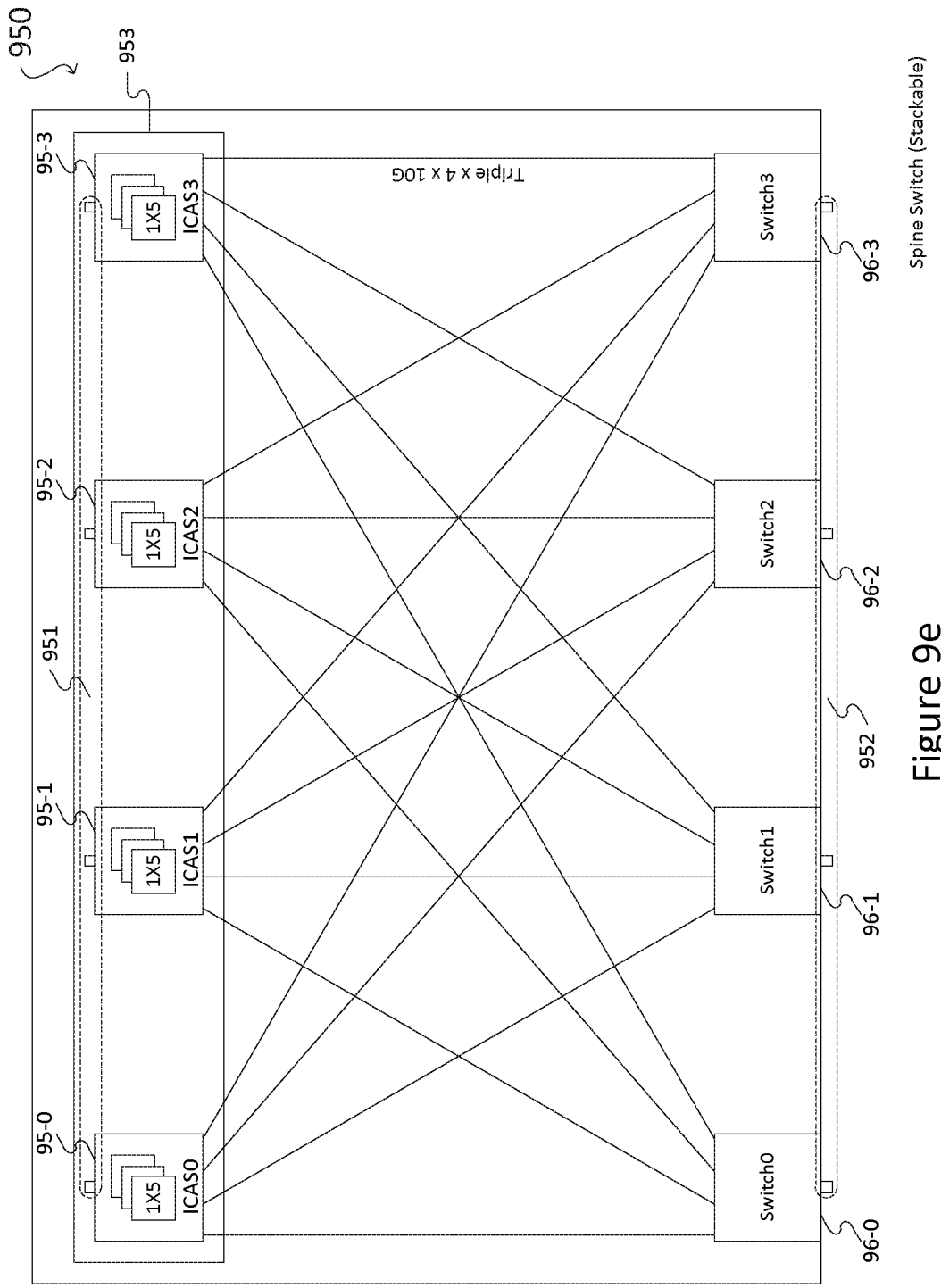
FIG. 9e shows a spine switch formed by stacking together 4 switch boxes implemented with a Trident-II ASICs (96× 10G configuration each) and 1 ICAS box 953. ICAS box 953 combines 4 ICAS modules 95-0 to 95-3 in one 1 U chassis. Each ICAS module contains 3 copies of ICAS1X5 configuration. Together the ICAS box 953 provides non-blocking 1:1 subscription ratio to each of the 4 switches 96-0 to 96-3.

Details of an ICAS-based stackable switching device 950 are shown in FIG. 9e. FIG. 9e shows ICAS modules 95-0 to 95-3 each connected in a full mesh topology to switches 96-0 to 96-3. In one embodiment, 4 Trident-II ASIC-based switches 96-0 to 96-3, each having a switching bandwidth of 24 QSFPs in 10G mode provided in 1:1 subscription ratio, and an ICAS box 953 integrating 4 ICAS modules 95-0 to 95-3 in one 1 U chassis and each ICAS module containing 3 duplicate copies of ICAS1X5 sub-modules and each sub-module providing 4×10G of uplink 951 may be used to builds a stackable spine switch, as shown in FIG. 9e. The 4 switches 96-0 to 96-3 provide ports 952 of 1.92 Tbps of bandwidth to connect to servers. The ICAS-based stackable switching device 950 provides total uplink bandwidth of 480 Gb/s (4×3×40 Gb/s) to connect to external network, facilitates non-blocking 1:1 subscription ratio and provides full mesh non-blocking interconnect with a total of 1.92 Tbps of switching bandwidth.

ICAS-based stackable switching device has the benefits of improved network congestion, saving the costs, power consumption and space savings than the switching devices implemented in the state of the art data center. As shown in the "ICAS+Stackable Chassis" column of Table 5, data center with ICAS and ICAS-based stackable switching device performs remarkably on data center network with total switching ASIC saving by 53.5%, total power consumption saving by 26.0%, total space saving by 25.6% and much improved network congestion. However total QSFP transceiver usage is increased by 2.3%.

The above stackable switching device is for illustrative purpose. A person experienced in the art can easily expand the scalability of the stackable switching device and should not be limited as in the illustration.

The stackable switching device addresses the insufficiency in the number of ports of network switching chip, thus making possible a flexible network configuration. However, a considerable number of connecting cables and conversion modules have to be used to interconnect the ICAS-based interconnection devices and the switching devices. To further reduce the use of cables and conversion modules, ICAS modules and switch chips can be electronically interconnected using a PCB and connectors, which is exactly how the multi-unit switching device is structured. Specifically, the ICAS module of the ICAS-based multi-unit switching device is electrically implemented as circuits, and the port groups of the ICAS module are soldered or crimped onto a PCB using connectors that support high-speed differential signals and impedance matching. The interconnection between the internal port groups is realized using a copper differential pair on the PCB. Since signal losses vary significantly between different grades of high-speed differential connectors and between copper differential pairs on different grades of PCBs, an active chip can be added at the back end of the connector to restore and enhance the signal to increase the signal transmission distance on the PCB. The ICAS module of the ICAS-based multi-unit switching device may be implemented on a PCB called a fabric card, or on a PCB called a backplane. The copper differential pair on the PCB interconnects the high-speed differential connector on the PCB to form a full mesh connectivity in the ICAS architecture. The switch chips and related circuits are soldered onto a PCB called a line card, which is equipped with a high-speed differential connector docking to the adapter on the fabric card. A multi-U chassis of the ICAS-based multi-unit switching device includes a plurality of ICAS fabric cards, a plurality of line cards, and one or two MCU- or CPU-based control cards, one or more power modules and cooling fan modules. "Rack unit" ("RU" or "U" for short) measures the height of a data center chassis, equal to 1.75 inches. A complete rack is 48 U (48 rack units) in height.

One embodiment of the present invention also provides a chassis-based multi-unit (rack unit) switching device. A multi-unit chassis switching device groups multiple switch ICs onto multiple line cards. Chassis-based multi-unit switching equipment interconnects with line cards, control cards, and CPU cards via PCB-based network cards or backplanes, which saves the cost of transceivers, fiber optic cable and rack space required for interconnection.

Figure 9F:
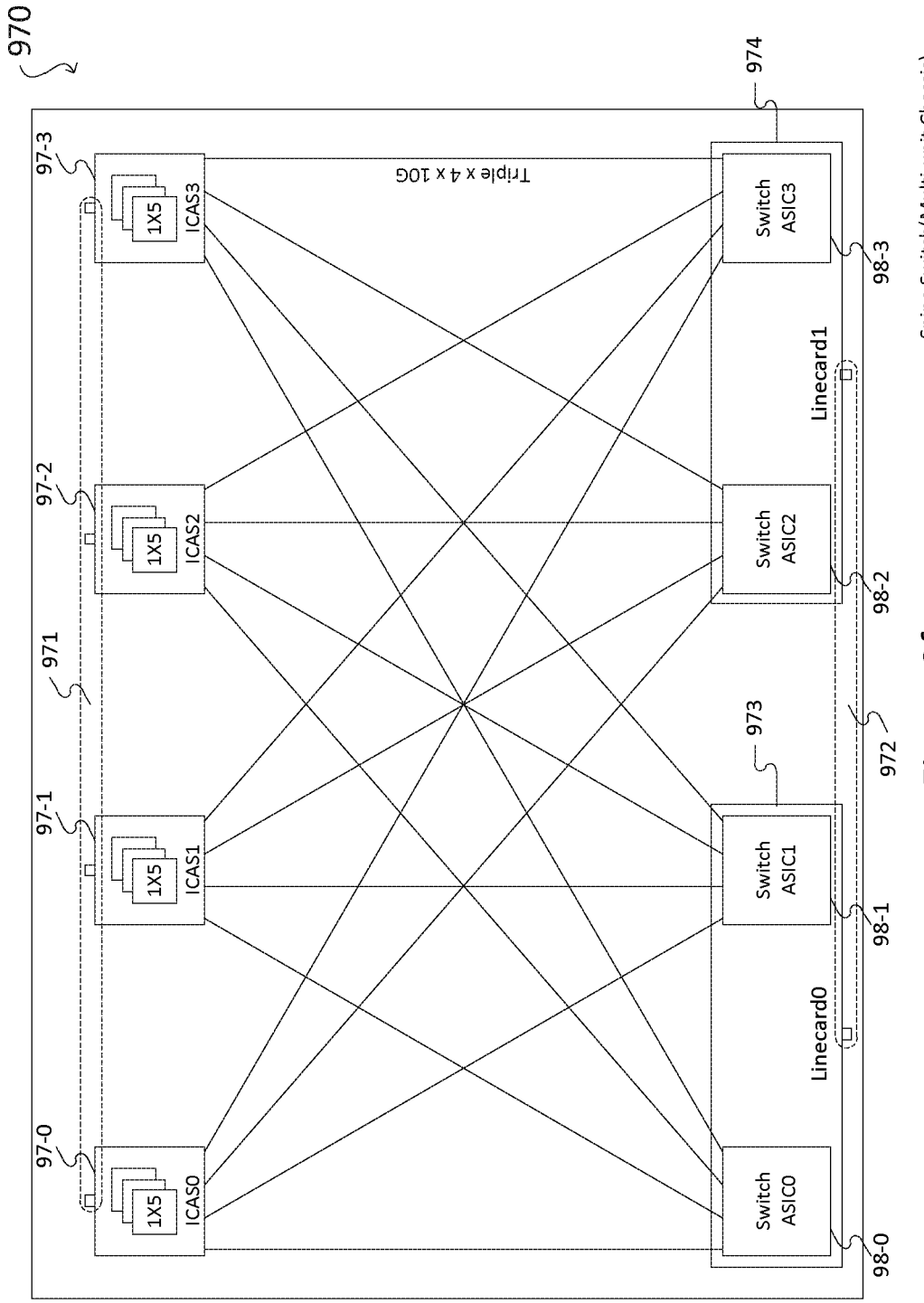
FIG. 9f shows a spine switch of an ICAS-based multi-unit switching device where 4 ICAS-based fabric cards 97-0 to 97-3 get connected in a full mesh topology to switching ASIC's 98-0 to 98-3. Switching ASIC 98-0 and 98-1 are housed in line card 973, and switching ASIC's 98-2 and 98-3 are housed in line card 974.

Details of an ICAS-based multi-unit chassis switching device 970 are shown in FIG. 9*f*. FIG. 9*f* shows 4 ICAS-based fabric cards 97-0 to 97-3 interconnected in a full mesh topology to switching ASIC's 98-0 to 98-3. Switching ASIC 98-0 and 98-1 are housed in line card 973, and switching ASIC's 98-2 and 98-3 are housed in line card 974. Line cards 973 and 974 are connected through high speed PCB (printed circuit board) connectors to fabric cards 97-0 to 97-3. In one embodiment, 4 Trident-II ASIC-based switches 98-0 to 98-3, each having a switching bandwidth of 24 QSFPs in 10G mode provided in 1:1 subscription ratio, and 4 ICAS-based fabric cards 97-0 to 97-3 containing 3 duplicate copies of ICAS1X5 sub-modules and each sub-module providing 4×10G of uplink 971 may be used to builds a multi-unit chassis switch, as shown in FIG. 9*f*. Two line cards provide data ports 972 of total 1.92 Tbps of bandwidth to connect to servers. ICAS-based multi-unit chassis switching device 970 provides total uplink bandwidth of 480 Gb/s (4×3×40 Gb/s) to connect to external network, facilitates full mesh non-blocking 1:1 subscription ratio interconnect with a total of 1.92 Tbps of switching bandwidth.

Multi-unit chassis-based switching device with fabric cards that are ICAS-based full mesh topology has the benefits of improved network congestion, saving the costs and power consumption than that of ASIC-based fabric cards implementation with fat tree topology. As shown in the "ICAS+Multi-unit Chassis" column of Table 5, data center with ICAS and ICAS-based multi-unit chassis-based switching device performs remarkably on data center network with total QSFP transceiver saving by 12.6%, total switching ASIC saving by 53.5%, total power consumption saving by 32.7%, total space saving by 29.95% and much improved network congestion.

The above multi-unit chassis switching device is for illustrative purpose. A person experienced in the art can easily expand the scalability of the multi-unit chassis switching device and should not be limited as in the illustration.

The multi-unit chassis-based switching device has the disadvantage of a much longer development time and a higher cost to manufacture due to its system complexity, and is also limited overall by the form factor of the multi-unit chassis. The multi-unit chassis-based switching device, though provides a much larger port count than the single-chip switching device. Although the stackable switching device requires additional transceivers and cables than that of the multi-unit chassis-based approach, the stackable switching device approach has the advantage of greater manageability in the internal network interconnection, virtually unlimited scalability, and requires significantly less time for assembling a much larger switching device.

The material required for (i) the data center networks of FIG. 2*a*, using state of the art multi-unit switching device ("Fat tree+Multi-unit Chassis"), (ii) an implementation of data center network 900 of FIG. 9*a*, using ICAS-based multi-unit switching device "ICAS+Multi-unit Chassis", and (iii) an implementation of data center network 900 of FIG. 9*a*, using ICAS-based stackable switching device "ICAS+Stackable Chassis" are summarized and compared in Table 5.

TABLE 5

|  | Fat tree + Multi-unit Chassis | ICAS + Multi-unit Chassis | ICAS + Stackable Chassis |
| --- | --- | --- | --- |
| Intralink (within Pod) | N/A | 5 | 5 |
| Interlink (Across Pod) | 4 | 5 | 5 |
| Downlink (to Server) | 12 | 15 | 15 |
| Total | 16 | 25 | 25 |
| D:U ratio | 3 | 3 | 3 |
| D:I ratio | N/A | 3 | 3 |
| Number of 10G Interface (for comparison) | 96 | 184.3 | 184.3 |
| QSFP XCVR Module (Watt) | 4 | 4 | 4 |
| TOR Switch (Watt) | 150 | 200 | 200 |
| Multi-unit Chassis (Watt) | 1660 | 0 | 0 |
| Spine-side Interlink QSFP XCVR | 18432 | 18800 | 38000 |
| TOR-side Interlink QSFP XCVR | 18432 | 18800 | 18800 |

TABLE 5-continued

|  | Fat tree + Multi-unit Chassis | ICAS + Multi-unit Chassis | ICAS + Stackable Chassis |
|---|---|---|---|
| Fabric/TOR-side Intralink QSFP XCVR | 36864 | 18800 | 18800 |
| Server-side QSFP XCVR | 55296 | 56400 | 56400 |
| Total QSFP XCVR | 129024 | 112800 (12.6%) | 132000 (−2.3%) |
| ASIC in Spine Switch | 2304 | 1600 | 1600 |
| ASIC in Fabric Switch | 4608 | 0 | 0 |
| ASIC in TOR Switch | 4608 | 3760 | 3760 |
| Total Switching ASIC | 11520 | 5360 (53.5%) | 5360 (53.5%) |
| Spine Switch (KW) | 392.448 | 327.2 | 472.0 |
| Fabric Switch (KW) | 784.896 | 0 | 0 |
| TOR Switch (KW) | 986.112 | 1128.0 | 1128.0 |
| Total Power Consumption (KW) | 2163.456 | 1455.2 (32.7%) | 1600 (26.0%) |
| 96 × QSFP Spine Switch (8U) | 1536 | 0 | 0 |
| 96 × QSFP Fabric Switch (8U) | 3072 | 0 | 0 |
| 48 × QSFP Spine Switch (4U) | 0 | 1600 | 1600 |
| TOR Switch (1U) | 4608 | 3760 | 3760 |
| ICAS1X5TRIPLE (1U) | 0 | 0 | 400 |
| ICAS5X21 (2U) | 0 | 376 | 376 |
| Transpose Rack (36U) | 0 | 720 | 720 |
| ICAS2X9 (1U) | 0 | 0 | 0 |
| ICAS8X33 (4U) | 0 | 0 | 0 |
| ICAS10X41 (6U) | 0 | 0 | 0 |
| ICAS16X65 (16U) | 0 | 0 | 0 |
| Total Rack Unit (U) | 9216 | 6456 (29.95%) | 6856 (25.6%) |
| Pod Interlink Bandwidth (Tbps) | 7.7 | 4.0 | 4.0 |
| Pod Intralink Bandwidth (Tbps) | 7.7 | 4.0 | 4.0 |
| Total Data Link Bandwidth (Pbps) | 2.2 | 2.2 | 2.2 |
| Per Plane Uplink Bandwidth (Tbps) | 7.7/plane | 0 | 0 |
| Total Spine Uplink Bandwidth (Tbps) | 0 | 150.4 | 601.6 |
| Total ICAS Uplink Bandwidth (Tbps) | 0 | 37.6 | 37.6 |
| Spine-side Interlink QSFP Cable | 18432 | 18800 | 18800 |
| QSFP Fanout Cable (Transpose Rack) | 0 | 37600 | 37600 |
| QSFP Fanout Cable (ICAS5X21) | 0 | 19740 | 19740 |
| TOR-side Interlink QSFP Cable | 0 | 18800 | 18800 |
| TOR-side Intralink QSFP Cable | 18432 | 18800 | 18800 |
| Spine Switch QSFP Cable | 0 | 0 | 19200 |
| QSFP Fanout Cable (ICAS1X5TRIPLE) | 0 | 0 | 19200 |
| Total QSFP Cable | 36864 | 56400 | 75600 |
| Total QSFP Fanout Cable | 0 | 57340 | 76540 |

As shown in Table 5, the ICAS-based systems require significantly less power dissipation, ASICs and space, resulting in reduced material costs and energy.

The above detailed description is provided to illustrate specific embodiments of the present invention and is not intended to be limiting. Numerous modifications and variations within the scope of the present invention are possible. The present invention is set forth in the accompanying claims.

What is claimed is:

1. An interconnect as a switch (ICAS) module, comprising:
   n port groups, each port group comprising n−1 interfaces, wherein n is an integer equal or larger than 3;
   an interconnecting network implementing a full mesh topology, wherein each of the n port groups connects one of the n−1 interfaces to another of the n port groups statically, respectively; and
   a plurality of first layer switches each configured and grouped into one of the n port groups respectively, by a single-connection routing or a multi-connection routing, wherein a number of the plurality of first layer switches is n, wherein the plurality of first layer switches is indexed with an integer from 0 to n−1;
   wherein the n−1 interfaces of the n port groups are labeled with the same indexes as those of connected n port groups; wherein an interface with index j of one of the n port groups with index i is connected to an interface with index i of one of the n port groups with index j, where i is in the range of 0 to n−1, j is in the range 0 to n−1, wherein i does not equal to j, and wherein the interconnecting network comprises all connections between the n port groups.

2. The ICAS module of claim 1, wherein
single-connection data between the plurality of first layer switches with index i connected to one of the n port groups with index i and the plurality of first layer switches with index j connected to one of the n port groups with index j is directly transmitted through one of the n−1 interfaces with index j of the n port groups with index i and the interface with index i of the n port groups with index j; and
wherein at least part of multi-connection data between the plurality of first layer switches with index i connected to one of the n port groups with index i and the plurality of first layer switches with index j connected to one of the n port groups with index j is transferred and transmitted through at least another one of the plurality of first layer switches connected to at least another one of the n port groups with index other than the i or j, wherein multi-connection data arriving at a destination switch will cease to be further routed and transmitted.

3. The ICAS module of claim 1, wherein one or more of the n port groups are configured to connect a group of uplinks of an external network.

4. The ICAS module of claim 1, wherein the interfaces of different ones of the n port groups are connected using optical media or electric circuit.

5. The ICAS module of claim 1, wherein the n port groups connect to the n−1 interfaces by an optical or an electric circuit, and wherein the plurality of first layer switches are grouped into one of the n port groups by a single-connection routing or a multi-connection routing by an optical or an electric circuitry.

6. A network pod, comprising the ICAS module according to claim 1, wherein the network pod further comprises:
   the plurality of first layer switches whose interfaces are divided into downlink interfaces, interlink interfaces and intralink interfaces, wherein the downlink interfaces are configured to receive and transmit data signals to and from a plurality of servers, wherein the interlink interfaces are configured to connect to higher layer switching devices, wherein each of the intralink interfaces of the plurality of first layer switches each is configured and grouped respectively into at least one of the n port groups; and
   one or more second layer devices of the ICAS module whose interfaces are divided into intralink interfaces and uplink interfaces, wherein the intralink interfaces of the ICAS module being grouped into the n port groups to connect to the corresponding one of the n port groups of the plurality of first layer switches, and each of the n port groups of another one ICAS module being connected to another one of the n port groups of each of the plurality of first layer switches, and wherein the uplink interfaces are configured to connect to an external network.

7. The network pod of claim 6, wherein the number of the plurality of first layer switches is a predetermined number, wherein the network pod with the predetermined number of the plurality of first layer switches working under a full mesh connection has a characteristics from the network with an (n−1, n) bipartite graph, wherein the network with (n−1, n) bipartite graph comprises the predetermined number of the plurality of first layer switches and the predetermined number minus one n−1 of the second layer fabric switches, and
   wherein, the plurality of first layer switches and the second layer fabric switches interconnect in a fat tree topology, wherein the kth intralink interface of the plurality of first layer switches each connects one of the intralink interfaces of the second layer fabric switch k, respectively, and the pth intralink interfaces of the second layer fabric switches each connects one of the intralink interfaces of the plurality of first layer switches p, respectively.

8. The network pod of claim 6, wherein the intralinks are realized using an optical media or an electric circuit.

9. The network pod of claim 6, wherein the intralink interfaces are realized using an optical media or an electric circuit.

* * * * *